US012626843B2

(12) United States Patent
Sakuma et al.

(10) Patent No.: US 12,626,843 B2
(45) Date of Patent: May 12, 2026

(54) RARE EARTH MAGNET AND METHOD FOR PRODUCING THEREOF

(71) Applicant: TOYOTA JIDOSHA KABUSHIKI KAISHA, Toyota (JP)

(72) Inventors: Noritsugu Sakuma, Mishima (JP); Tetsuya Shoji, Susono (JP); Akihito Kinoshita, Mishima (JP); Akira Kato, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 747 days.

(21) Appl. No.: 17/465,961

(22) Filed: Sep. 3, 2021

(65) Prior Publication Data

US 2022/0130580 A1 Apr. 28, 2022

(30) Foreign Application Priority Data

Oct. 22, 2020 (JP) ................................ 2020-177487

(51) Int. Cl.

*H01F 1/055* (2006.01)
*C22C 38/00* (2006.01)
*H01F 1/057* (2006.01)

(52) U.S. Cl.

CPC ......... *H01F 1/0551* (2013.01); *C22C 38/005* (2013.01); *H01F 1/0576* (2013.01); *C22C 2202/02* (2013.01)

(58) Field of Classification Search

CPC ............. C22C 2202/02; C22C 38/005; C22C 33/0242; C22C 38/002; C22C 38/06;

(Continued)

(56) References Cited

U.S. PATENT DOCUMENTS 4,765,848 A 8/1988 Mohri et al.
5,129,963 A 7/1992 Panchanathan et al.

(Continued)

FOREIGN PATENT DOCUMENTS

CN 108878089 A 11/2018
CN 109979699 A 7/2019

(Continued)

OTHER PUBLICATIONS

Sep. 23, 2022 Requirement for Restriction/Election issued in U.S. Appl. No. 17/219,995.

(Continued)

*Primary Examiner* — Nicholas A Wang
(74) *Attorney, Agent, or Firm* — Oliff PLC

(57) ABSTRACT

To provide an R—Fe—B-based rare earth magnet excellent in the squareness and magnetic properties at high temperatures, and method for producing thereof.

The present disclosure relates to a rare earth magnet including a main phase 10 and a grain boundary phase 20 present around the main phase 10, and a method for producing thereof. In the rare earth magnet of the present disclosure, the overall composition is represented, in terms of molar ratio, by the formula: $(R^1_{(1-x)}La_x)_y(Fe_{(1-z)}Co_z)_{(100-y-w-v)}B_wM^1_v$, wherein $R^1$ is a predetermined rare earth element, $M^1$ is a predetermined element, $0 \leq x \leq 0.1$, $12.0 \leq y \leq 20.0$, $0.1 \leq z \leq 0.3$, $5.0 \leq w \leq 20.0$, and $0 \leq v \leq 2.0$. The main phase 10 has an $R_2Fe_{14}B$-type crystal structure, the average particle diameter of the main phase 10 is less than 1 μm, and the volume ratio of a phase having an $RFe_2$-type crystal structure in the grain boundary phase 20 is 0.40 or less relative to the grain boundary phase 20.

9 Claims, 4 Drawing Sheets

(58) Field of Classification Search
CPC ....... C22C 38/10; C22C 38/16; H01F 1/0577; H01F 41/0293; H01F 1/0576; H01F 1/0551; H01F 1/0571; H01F 41/0253; H01F 41/0266; H01F 41/0273; B22F 2009/048; B22F 2301/355; B22F 2998/10; B22F 2999/00; B22F 9/04; B22F 2202/05; B22F 3/02; B22F 3/10
See application file for complete search history.

(56) References Cited

U.S. PATENT DOCUMENTS

| | | | |
|---|---|---|---|
| RE34,838 | E | 1/1995 | Mohri et al. |
| 2007/0079904 | A1 | 4/2007 | Mori et al. |
| 2011/0234350 | A1 | 9/2011 | Yan et al. |
| 2012/0247624 | A1* | 10/2012 | Sakuma ................ C22C 38/005 148/538 |
| 2014/0191831 | A1 | 7/2014 | Yamazaki et al. |
| 2014/0238553 | A1* | 8/2014 | Sakuma .................... B22F 9/06 148/513 |
| 2014/0242267 | A1 | 8/2014 | Shoji et al. |
| 2016/0141083 | A1 | 5/2016 | Ito et al. |
| 2018/0182519 | A1 | 6/2018 | Ito et al. |
| 2020/0027657 | A1 | 1/2020 | Yang et al. |

FOREIGN PATENT DOCUMENTS

| | | | |
|---|---|---|---|
| DE | 4331563 | A1 | 3/1994 |
| EP | 2908319 | A1 | 8/2015 |
| EP | 3522178 | A1 | 8/2019 |
| JP | S61-159708 | A | 7/1986 |
| JP | 0633581 | * | 1/1995 |
| JP | H07118787 | * | 5/1995 |
| JP | 2005-097711 | A | 4/2005 |
| JP | 2018-110208 | A | 7/2018 |
| JP | 3522178 | * | 8/2019 |
| JP | 2020-013999 | A | 1/2020 |
| JP | 2020-027933 | A | 2/2020 |
| WO | 2013/073486 | A1 | 5/2013 |
| WO | 2014/196605 | A1 | 12/2014 |

OTHER PUBLICATIONS

Niu et al., "Achievement of high coercivity in sintered R-Fe-B magnets based on misch-metal by dual alloy method," 2014, J. Appl. Phys., vol. 115. (Year: 2014).

Gabay et al., "Infiltration of Die-Upset Nd-Fe-B Magnets With Mischmetal Eutectic Alloys," 2018, IEEE Magnetics Letters, vol. 9. (Year: 2018).

Nov. 21, 2022 Office Action issued in U.S. Appl. No. 17/219,995.

U.S. Appl. No. 17/219,995, filed Apr. 1, 2021 in the name of Sakuma et al.

Apr. 14, 2023 Office Action issued in U.S. Appl. No. 17/219,995.

Aug. 25, 2023 Advisory Action issued in U.S. Appl. No. 17/219,995.

Majima et al.; "Effects of Co Addition on the Sintering Characteristics of Nd2Fe14B Alloy"; Journal of the Japan Society of Powder and Powder Metallurgy; Oct. 1992; vol. 39; No. 10; pp. 855-859.

* cited by examiner

RARE EARTH MAGNET AND METHOD FOR PRODUCING THEREOF

TECHNICAL FIELD

The present disclosure relates to a rare earth magnet and a method for producing thereof. More specifically, the present disclosure relates to an R—Fe—B-based rare earth magnet, wherein R is a rare earth element, and a method for producing thereof.

BACKGROUND ART

The R—Fe—B-based rare earth magnet has a main phase and a grain boundary phase present around the main phase. The main phase is a magnetic phase having an $R_2Fe_{14}B$-type crystal structure. This main phase enables obtaining high residual magnetization. Accordingly, the R—Fe—B-based rare earth magnet is often used for motors.

In the case where a permanent magnet including the R—Fe—B-based rare earth magnet is used for motors, the permanent magnet is disposed under a periodically changing external magnetic field environment and therefore, the permanent magnet may be demagnetized due to an increase in the external magnetic field. When used for motors, the permanent magnet is required to undergo as little demagnetization as possible in response to an increase in the external magnetic field. A demagnetization curve shows the degree of demagnetization in response to an increase in the external magnetic field, and the demagnetization curve satisfying the requirement above has a square shape. Consequently, satisfying the above-described requirement is referred to as excellent squareness.

Since a motor generates heat during its operation, the permanent magnet used for motors is required to have high residual magnetization at high temperatures. In the present description, regarding the magnetic properties, the high temperature refers to a temperature in the range from 100 to 200° C., particularly from 140 to 180° C.

As R of the R—Fe—B-based rare earth magnet, Nd has been mainly selected, but the rapid spread of electric vehicles poses a concern over an escalating price of Nd. For this reason, use of inexpensive light rare earth elements is being studied as well. For example, Patent Literature 1 discloses an R—Fe—B-based rare earth magnet where light rare earth elements Ce and La are selected as R of the R—Fe—B-based rare earth magnet. In addition, Patent Literature 2 discloses an R—Fe—B-based rare earth magnet where part of Nd as R of the R—Fe—B-based rare earth magnet is replaced by Ce and part of Fe is replaced by Co.

CITATION LIST

Patent Literature

[PTL 1] Japanese Unexamined Patent Publication No. 61-159708

[PTL 2] International Publication WO2014/196605

SUMMARY OF INVENTION

Technical Problem

As in the R—Fe—B-based rare earth magnet disclosed in Patent Literature 1, when a light rare earth element is simply selected as R, the magnetic properties are reduced. As in the R—Fe—B-based rare earth magnet disclosed in Patent Literature 2, when part of Fe is replaced by a small amount of Co, this is known to increase the corrosion resistance. In addition, incorporation of Co is generally known to be effective in enhancing the magnetic properties at high temperatures, particularly, the residual magnetization at high temperatures. However, the squareness is deteriorated by the incorporation of Co.

The present disclosure has been made to solve the problems above. An object of the present disclosure is to provide an R—Fe—B-based rare earth magnet with excellent squareness and magnetic properties at high temperatures, particularly, residual magnetization at high temperatures, and a method for producing thereof.

Solution to Problem

The present inventors have made many intensive studies to attain the object above and have accomplished the rare earth magnet of the present disclosure and the method for producing thereof. The rare earth magnet of the present disclosure and the method for producing thereof include the following aspects.

<1> A rare earth magnet including a main phase and a grain boundary phase present around the main phase, wherein the overall composition is represented, in terms of molar ratio, by the formula: $(R^1_{(1-x)}La_x)_y(Fe_{(1-z)}Co_z)_{(100-y-w-v)}B_wM^1_v$, wherein $R^1$ is one or more elements selected from the group consisting of Nd, Pr, Gd, Tb, Dy and Ho, $M^1$ is one or more elements selected from the group consisting of Ga, Al, Cu, Au, Ag, Zn, In and Mn, and unavoidable impurity elements, $0 \le x \le 0.1$, $12.0 \le y \le 20.0$, $0.1 \le z \le 0.3$, $5.0 \le w \le 20.0$, and $0 \le v \le 2.0$, the main phase has an $R_2Fe_{14}B$-type, wherein R is a rare earth element, crystal structure, the average particle diameter of the main phase is less than 1 μm, and the volume ratio of a phase having an $RFe_2$-type crystal structure in the grain boundary phase is 0.40 or less relative to the grain boundary phase.

<2> A rare earth magnet including a main phase and a grain boundary phase present around the main phase, wherein the overall composition is represented, in terms of molar ratio, by the formula: $(R^1_{(1-x)}La_x)_y(Fe_{(1-z)}Co_z)_{(100-y-w-v)}B_wM^1_v\cdot(R^2_{(1-s)}M^2_s)_t$ (wherein each of $R^1$ and $R^2$ is one or more elements selected from the group consisting of Nd, Pr, Gd, Tb, Dy and Ho, $M^1$ is one or more elements selected from the group consisting of Ga, Al, Cu, Au, Ag, Zn, In and Mn, and an unavoidable impurity element, $M^2$ is composed of a metal element which is other than a rare earth element and can be alloyed with $R^2$, and unavoidable impurity elements, $0 \le x \le 0.1$, $12.0 \le y \le 20.0$, $0.1 \le z \le 0.3$, $5.0 \le w \le 20.0$, $0 \le v \le 2.0$, $0.05 \le s \le 0.40$, and $0.1 \le t \le 10.0$, x and z satisfy $z \le 2x+0.2$, the main phase has an $R_2Fe_{14}B$-type crystal structure, wherein R is a rare earth element the average particle diameter of the main phase is less than 1 μm, and the volume ratio of a phase having an $RFe_2$-type crystal structure in the grain boundary phase is 0.40 or less relative to the grain boundary phase.

<3> The rare earth magnet according to item <2>, wherein t satisfies $1.0 \le t \le 2.5$.

<4> The rare earth magnet according to item <2> or <3>, wherein $R^2$ is one or more elements selected from the group consisting of Nd and Tb and $M^2$ is Cu and an unavoidable impurity element.

<5> The rare earth magnet according to any one of <1> to <4>, wherein $R^1$ is one or more elements selected from the group consisting of Nd and Pr and $M^1$ is one or more elements selected from the group consisting of Ga, Al and Cu, and an unavoidable impurity element.

<6> A method for producing the rare earth magnet according to item <1>, including:

preparing a molten alloy having a composition represented, in terms of molar ratio, by the formula: $(R^1_{(1-x)}La_x)_y(Fe_{(1-z)}Co_z)_{(100-y-w-v)}B_wM^1_v$, wherein $R^1$ is one or more elements selected from the group consisting of Nd, Pr, Gd, Tb, Dy and Ho, $M^1$ is one or more elements selected from the group consisting of Ga, Al, Cu, Au, Ag, Zn, In and Mn, and an unavoidable impurity elements, $0 \le x \le 0.1$, $12.0 \le y \le 20.0$, $0.1 \le z \le 0.3$, $5.0 \le w \le 20.0$, and $0 \le v \le 2.0$, cooling the molten alloy at a rate of $5\times10^5$ to $5\times10^7$° C./sec to obtain a magnetic ribbon or a magnetic flake, and pressure-sintering the magnetic ribbon or magnetic flake to obtain a sintered body.

<7> The method for producing a rare earth magnet according to item <6>, wherein the magnetic ribbon or magnetic flake is pressure-sintered at 550 to 750° C.

<8> The method for producing a rare earth magnet according to item <6> or <7>, further including subjecting the sintered body to hot plastic working.

<9> The method for producing a rare earth magnet according to any one of <6> to <8>, wherein:

x and z satisfy $z \le 2x+0.2$, and the method for producing further includes:

preparing a modifier having a composition represented, in terms of molar ratio, by the formula: $R^2_{(1-s)}M^2_s$ (wherein $R^2$ is one or more elements selected from the group consisting of Nd, Pr, Gd, Tb, Dy and Ho, $M^2$ is composed of a metal element which is other than a rare earth element and can be alloyed with $R^2$, and unavoidable impurity elements, and $0.05 \le s \le 0.40$, and causing the modifier diffused and infiltrated into the sintered body.

<10> The method for producing a rare earth magnet according to item <9>, wherein the diffusive penetration is performed at 550 to 750° C.

<11> The method for producing a rare earth magnet according to item <9> or <10>, wherein $R^2$ is Nd and Tb and $M^2$ is Cu and unavoidable impurity elements.

<12> The method for producing a rare earth magnet according to any one of <6> to <11>, wherein $R^1$ is one or more elements selected from the group consisting of Nd and Pr and $M^1$ is one or more elements selected from the group consisting of Ga, Al and Cu, and unavoidable impurity elements.

Advantageous Effects of Invention

According to the present invention, an R—Fe—B-based rare earth magnet where the main phase is nanocrystallized, a predetermined amount of La is optionally contained as part of R, generation of a phase having an $RFe_2$-type crystal structure that impairs squareness is suppressed, and high-temperature residual magnetization is enhanced by containing Co, and a method for producing thereof, can be provided.

DESCRIPTION OF EMBODIMENTS

The embodiments of the rare earth magnet of the present disclosure and the method for producing thereof are described in detail below. Incidentally, the embodiments described below should not be construed as limiting the rare earth magnet of the present disclosure and the method producing thereof.

Figure 1:
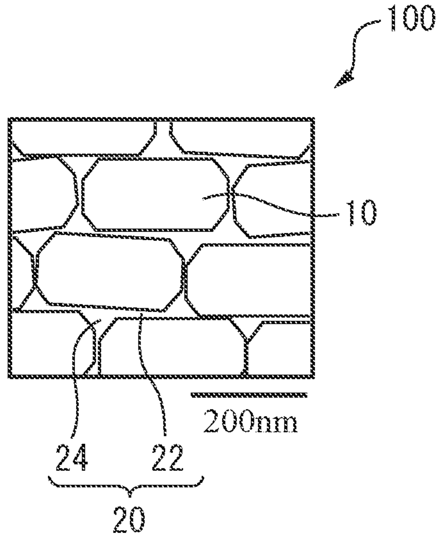
FIG. 1 is an explanatory diagram schematically illustrating a microstructure of the rare earth magnet of the present disclosure.
Figure 8:
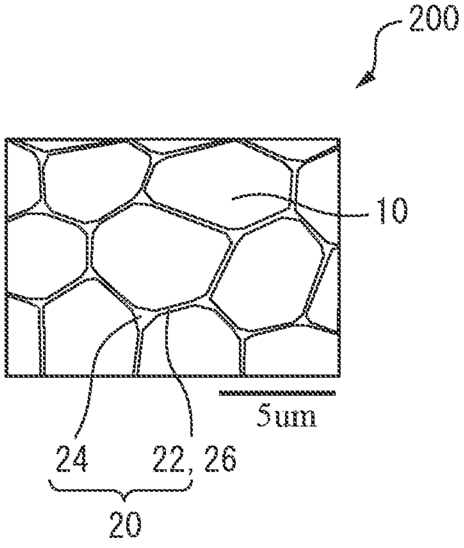
FIG. 8 is a diagram schematically illustrating a microstructure of the conventional rare earth magnet.

With respect to enhancing the squareness and magnetic properties at high temperatures, particularly, the residual magnetization at high temperatures, the knowledge acquired by the present inventors is described using the drawings. FIG. 1 is an explanatory diagram schematically illustrating a microstructure of the rare earth magnet of the present disclosure. FIG. 8 is a diagram schematically illustrating a microstructure of the conventional rare earth magnet.

In an R—Fe—B-based rare earth magnet, a phase having an $R_2Fe_{14}B$-type crystal structure can be stably obtained by solidifying a molten alloy containing a larger amount of R than in the theoretical composition of $R_2Fe_{14}B$ (R is 11.8 mol %, Fe is 82.3 mol %, and B is 5.9 mol %). In the following description, the molten alloy containing a larger amount of R than in the theoretical composition of $R_2Fe_{14}B$ is sometimes referred to as "R-rich molten alloy", and a phase having an $R_2Fe_{14}B$-type crystal structure is sometimes referred to as "$R_2Fe_{14}B$ phase".

When an R-rich molten alloy is solidified, as illustrated in FIG. 1 and FIG. 8, a microstructure including a main phase 10 and a grain boundary phase 20 present around the main phase 10 is obtained. The grain boundary phase 20 has an adjacent part 22 in which two main phases 10 are adjacent to each other, and a triple point 24 surrounded by three main phases 10. In the conventional rare earth magnet 200, many phases 26 having an $RFe_2$-type crystal structure are present in the adjacent part 22 of the grain boundary phase 20. The phase having an $RFe_2$-type crystal structure is a ferromagnetic phase and when many phases having an $RFe_2$-type crystal structure are present in the grain boundary phase 20, the squareness is reduced.

The R—Fe—B-based rare earth magnet includes a sintered magnet obtained by subjecting a magnetic powder with the main phase having a particle diameter of 1 to 10 μm to pressureless sintering at a high temperature of 900 to 1,100° C. or more, and a hot-plastic worked magnet obtained by pressure-sintering (hot pressing) a magnetic ribbon or magnetic flake with the main phase being nanocrystallized, at a low temperature of 550 to 750° C. In order to impart anisotropy to the sintered magnet, a powder compact is obtained by shaping a magnetic powder in a magnetic field, and the powder compact is subjected to pressureless sintering. Even when a powder compact is obtained by shaping, in a magnetic field, a magnetic ribbon or magnetic flake with the main phase being nanocrystallized, since the main phase is excessively fine, it is difficult to impart anisotropy. Therefore, the anisotropy is imparted by hot-plastic working a sintered body that is obtained by pressure sintering of a magnetic ribbon or flake.

The magnetic powder with the main phase having a particle diameter of 1 to 10 μm is obtained by quenching a molten alloy having a composition of R—Fe—B-based rare earth magnet by use of a strip casting method, etc., and pulverizing the obtained magnetic ribbon or flake. The magnetic ribbon or flake with the main phase being nanocrystallized is obtained by rapidly quenching a molten alloy having a composition of R—Fe—B-based rare earth magnet by use of a liquid quenching method, etc.

A phase 26 having an $RFe_2$-type crystal structure illustrated in FIG. 8 is readily generated at the time of obtaining a magnetic ribbon or flake with the main phase having a particle diameter of 1 to 10 μm. In addition, a sintered body obtained by pulverizing a magnetic ribbon or flake with the main phase having a particle diameter of 1 to 10 μm and subjecting the resulting powder to pressureless sintering has a low coercivity as it is and therefore, a heat treatment is often applied thereto (hereinafter, such a heat treatment is referred to as "optimization heat treatment"). As for the conditions in the optimization heat treatment, typically, a sintered body is held at 850 to 1,000° C. for 50 to 300 minutes and then cooled to a temperature of 450 to 700° C. at a rate of 0.1 to 5.0° C./min. During the optimization heat treatment, particularly, in the cooling process of the optimization heat treatment, a phase 26 having an $RFe_2$-type crystal structure is likely to be generated.

When part of Fe of the R—Fe—B-based rare earth magnet is replaced by Co, the Curie point rises and in turn, the magnetic properties at high temperatures, particularly, the residual magnetization at high temperatures, are enhanced. On the other hand, when part of Fe of the R—Fe—B-based rare earth magnet is replaced by Co, a phase having an $RFe_2$-type crystal structure is readily generated.

However, as in the R—Fe—B-based rare earth magnet 100 of the present disclosure illustrated in FIG. 1, when the main phase 10 takes on a rapid-quenched microstructure to such an extent as to be nanocrystallized, even if part of Fe is replaced by Co, generation of a phase having an $RFe_2$-type crystal structure can be suppressed. Consequently, in the R—Fe—B-based rare earth magnet 100 of the present disclosure, a phase 26 having an $RFe_2$-type crystal structure is not present in the grain boundary phase 20, or even if it is present, the amount thereof is very small. The squareness of the R—Fe—B-based rare earth magnet 100 of the present disclosure is thereby enhanced. In addition, a phase 26 having an $RFe_2$-type crystal structure is likely to trigger the magnetization reversal and therefore, when a phase 26 having an $RFe_2$-type crystal structure is not present or even if it is present, the amount thereof is very small, this contributes to an enhancement of coercivity as well.

Furthermore, when the R—Fe—B-based rare earth magnet 100 of the present disclosure contains La, generation of a phase having an $RFe_2$-type crystal structure can be more suppressed. In the R—Fe—B-based rare earth magnet of the present disclosure, for example, a melt of a low-melting-point alloy such as Nd—Cu alloy is diffused and infiltrated as a modifier in order to enhance the coercivity, so that the melt of a modifier can be diffused and infiltrated at a temperature not allowing for coarsening of the nanocrystallized main phase. However, such a diffusing and infiltrating temperature is a temperature where a phase 26 having an $RFe_2$-type crystal structure is readily generated in the grain boundary phase 20. Therefore, when the R—Fe—B-based rare earth magnet 100 of the present disclosure contains La, generation of a phase 26 having an $RFe_2$-type crystal structure during diffusing and infiltrating can be still more suppressed.

As disclosed in Patent Literature 1, in the case of selecting a light rare earth element as R, it has heretofore been common practice to include Ce in the selection. However, since Ce promotes generation of a phase having an $RFe_2$-type crystal structure, in the rare earth magnet of the present disclosure, La is selected as the light rare earth element, other than a very small amount of Ce contained as an unavoidable impurity element.

In the R—Fe—B-based rare earth magnet disclosed in Patent Literature 2, the main phase is nanocrystallized, and part of Fe is replaced by Co. However, in the R—Fe—B-based rare earth magnet disclosed in Patent Literature 2, part of Fe is replaced by Co mainly for the purpose of enhancing the corrosion resistance, and the replacement rate is low. Therefore, generation of a phase 26 having an $RFe_2$-type crystal structure is less likely to pose a problem. On the other hand, as in the R—Fe—B-based rare earth magnet 100 of the present disclosure, a larger amount of Co needs to be contained for enhancing the magnetic properties at high temperatures, particularly, the residual magnetization at high temperatures.

In R—Fe—B-based rare earth magnet of the present disclosure, for enhancing the magnetic properties at high temperatures, Co is contained at a predetermined relatively high ratio (molar ratio). Due to Co contained in a predetermined relatively high ratio (molar ratio), a phase 26 having an $RFe_2$-type crystal structure is readily generated, and the squareness is reduced. However, at the time of obtaining a magnetic ribbon or flake, the main phase is rapidly quenched to such an extent as to be nanocrystallized, and generation of a phase 26 having an $RFe_2$-type crystal structure is thereby suppressed. In addition, the R—Fe—B-based rare earth magnet of the present disclosure contains La at a predetermined ratio, and this makes it possible to more suppress generation of a phase 26 having an $RFe_2$-type crystal structure, which is generated at the time of production of a magnetic ribbon or magnetic flake or at the time of processing of the magnetic ribbon or magnetic flake, and enhance the squareness.

The configuration requirements of the rare earth magnet of the present disclosure based on these knowledges and the method for producing thereof are described below.

<<Rare Earth Magnet>>

First, the configuration requirements of the rare earth magnet of the present disclosure are described.

As illustrated in FIG. 1, the rare earth magnet 100 of the present disclosure has a main phase 10 and a grain boundary phase 20. In the following, the overall composition, the main phase 10 and the grain boundary phase 20 of the rare earth magnet 100 of the present disclosure are described.

<Overall Composition>

The overall composition of the rare earth magnet 100 of the present disclosure is described. The overall composition of the rare earth magnet 100 of the present disclosure means a combined composition of all main phases 10 and grain boundary phases 20.

The overall composition of the rare earth magnet of the present disclosure is, in terms of molar ratio, represented by the formula: $(R^1_{(1-x)}La_x)_y(Fe_{(1-z)}Co_z)_{(100-y-w-v)}B_wM^1_v$, or the formula: $(R^1_{(1-x)}La_x)_y(Fe_{(1-z)}Co_z)_{(100-y-w-v)}B_wM^1_v\cdot(R^2_{(1-s)}M^2_s)_t$. The formula: $(R^1_{(1-x)}La_x)_y(Fe_{(1-z)}Co_z)_{(100-y-w-v)}B_wM^1_v$ represents an overall composition when a modifier is not diffused and infiltrated. The formula: $(R^1_{(1-x)}La_x)_y(Fe_{(1-z)}Co_z)_{(100-y-w-v)}B_wM^1_v\cdot(R^2_{(1-s)}M^2_s)_t$ represents an overall composition when a modifier is diffused and infiltrated. In the formula, the first half $(R^1_{(1-x)}La_x)_y(Fe_{(1-z)}Co_z)_{(100-y-w-v)}B_wM^1_v$ represents a composition derived from a sintered body (rare earth magnet precursor) before causing a modifier diffused and infiltrated, and the last half $(R^2_{(1-s)}M^2_s)_t$ represents a composition derived from a modifier.

In the case of causing a modifier to diffused and infiltrated, assuming 100 parts by mol of a sintered body is a rare earth magnet precursor, t parts by mol of a modifier is diffused and infiltrated into the inside of the precursor, and (100+t) parts by mol of the rare earth magnet of the present disclosure is thereby obtained.

In the formula representing the overall composition of the rare earth magnet of the present disclosure, the total of $R^1$ and La is y parts by mol, the total of Fe and Co is (100−y−w−v) parts by mol, B is w parts by mol, and $M^1$ is v parts by mol. Accordingly, the total of these is y parts by mol+(100−y−w−v) parts by mol+w parts by mol+v parts by mol=100 parts by mol. The total of $R^2$ and $M^2$ is t parts by mol.

In the formulae above, $R^1_{(1-x)}La_x$ means that, in terms of molar ratio, $(1-x)R^1$ and xLa are present relative to the total of $R^1$ and La. Similarly, in the formulae above, $Fe_{(1-z)}Co_z$ means that, in terms of molar ratio, (1−z)Fe and zCo are present relative to the total of Fe and Co. In addition, similarly, in the formulae above, $R^2_{(1-s)}M^2_s$ means that, in terms of molar ratio, $(1-s)R^2$ and $sM^2$ are present relative to the total of $R^2$ and $M^2$.

In the formulae above, each of $R^1$ and $R^2$ is one or more elements selected from the group consisting of Nd, Pr, Gd, Th, Dy and Ho. Nd is neodymium, Pr is praseodymium, Gd is gadolinium, Tb is terbium, Dy is dysprosium, and Ho is holmium. Fe is iron, Co is cobalt, and B is boron. $M^1$ is one or more elements selected from the group consisting of Ga, Al, Cu, Au, Ag, Zn, In and Mn, and unavoidable impurity elements. Ga is gallium, Al is aluminum, Cu is copper, Au is gold, Ag is silver, Zn is zinc, In is indium, and Mn is manganese. $M^2$ is composed of a metal element which is other than a rare earth element and can be alloyed with $R^2$, and an unavoidable impurity elements.

In the present description, unless otherwise indicated, the rare earth elements are 17 elements of Sc, Y, La, Ce, Pr, Nd, Pm, Sm, Eu, Gd, Tb, Dy, Ho, Er, Tm, Yb and Lu. Among these, unless otherwise indicated, Sc, Y, La and Ce are light rare earth elements. In addition, unless otherwise indicated, Pr, Nd, Pm, Sm and Eu are medium rare earth elements. Furthermore, unless otherwise indicated, Gd, Th, Dy, Ho, Er, Tm, Yb and Lu are heavy rare earth elements. Incidentally, in general, the rarity of the heavy rare earth element is high, and the rarity of the light rare earth element is low. The rarity of the medium rare earth element is between the heavy rare earth element and the light rare earth element. Note that Sc is scandium, Y is yttrium, La is lanthanum, Ce is cerium, Pr is praseodymium, Nd is neodymium, Pm is promethium, Sm is samarium, Eu is europium, Gd is gadolinium, Tb is terbium, Dy is dysprosium, Ho is holmium, Er is erbium, Tm is thulium, Yb is ytterbium, and Lu is lutetium.

The constituent elements of the rare earth magnet of the present disclosure represented by the formula above are described below.

<$R^1$>

$R^1$ is an essential component for the rare earth magnet of the present disclosure. As described above, $R^1$ is one or more elements selected from the group consisting of Nd, Pr, Gd, Tb, Dy and Ho. $R^1$ is an element constituting the main phase (a phase having an $R_2Fe_{14}B$-type crystal structure (hereinafter, sometimes referred to as "$R_2Fe_{14}B$ phase")). In view of the balance among residual magnetization, coercivity and cost, $R^1$ is preferably one or more elements selected from the group consisting of Nd an Pr. In the case of letting Nd and Pr be present together as $R^1$, didymium may be used.

<La>

La is an optional component in the rare earth magnet of the present disclosure. La is an element constituting the $R_2Fe_{14}B$ phase together with $R^1$. The rare earth magnet of the present disclosure is produced using a magnetic ribbon or magnetic flake in which the main phase is nanocrystallized. At the time of production of the magnetic ribbon or magnetic flake, the molten alloy is rapidly quenched to the extent that the main phase is nanocrystallized, and generation of a phase having an $RFe_2$-type crystal structure can thereby be suppressed. When the molten alloy contains La, generation of a phase having an $RFe_2$-type crystal structure can be more suppressed at the time of the production of the magnetic ribbon or magnetic flake. In addition, when the magnetic ribbon or magnetic flake contains La, in the process of producing the rare earth magnet of the present disclosure from the magnetic ribbon or magnetic flake, generation of a phase having an $RFe_2$-type crystal structure can be still more suppressed. As a result, containing La can facilitate further enhancing the squareness of the rare earth magnet of the present disclosure. Although not bound by theory, this is considered achieved because La has a large atomic diameter, compared with other rare earth elements, and can hardly generate a phase having an $RFe_2$-type crystal structure.

As described above, the rare earth magnet of the present invention has a nanocrystallized main phase. Therefore, when the rare earth magnet of the present invention is prepared as its precursor, at the time of diffusing and infiltrating a modifier into the precursor, a melt of a low-melting-point alloy such as Nd—Cu alloy is diffused and infiltrated. At the diffusing and infiltrating temperature here, a phase having an $RFe_2$-type crystal structure is likely to be generated from the grain boundary phase, but by configuring the grain boundary phase to contain La, generation of a phase having an $RFe_2$-type crystal structure can be more suppressed. In addition, when a modifier containing heavy rare earth elements, particularly, Tb and Dy, is diffused and infiltrated, the effect of magnetically separating main phases from one another is large, but, on the other hand, a heavy rare earth element is diffused and infiltrated into the grain boundary phase and Co are likely to generate a phase having an $RFe_2$-type crystal structure. However, generation of a phase having an $RFe_2$-type crystal structure can be advantageously suppressed by containing La.

<Molar Ratio of $R^1$ and La>

As described above, in the rare earth magnet of the present disclosure, La is not essential, but generation of a phase having an $RFe_2$-type crystal structure can be more suppressed by containing La. Here, the molar ratio of $R^1$ and La in the case of containing La is described. Incidentally, in the case of not containing La, in the formula representing the overall composition above, x is 0.

In the R—Fe—B-based rare earth magnet, it is difficult for La alone as R to generate an $R_2Fe_{14}B$ phase with Fe and B. However, when La is selected as part of R, an $R_2Fe_{14}B$ phase can be generated. In addition, generation of a phase having an $RFe_2$-type crystal structure can be suppressed due to La, as a result, the squareness can be enhanced.

If even a small amount of La is contained, generation of a phase having an $RFe_2$-type crystal structure can be suppressed, and when x is 0.01 or more, suppression of the generation of a phase having an $RFe_2$-type crystal structure is practically recognized. From the viewpoint of suppressing the generation of a phase having an $RFe_2$-type crystal structure, x may be 0.02 or more, 0.025 or more, 0.03 or more, 0.04 or more, or 0.05 or more. On the other hand, when x is 0.1 or less, no difficulty is added to the generation of an $R_2Fe_{14}B$ phase. From this viewpoint, x may be 0.09 or less, 0.08 or less, or 0.07 or less. In this way, even when the ratio (molar ratio) of the content of La to the content of $R^1$ is very small, the effect of suppressing the generation of a phase having an $RFe_2$-type crystal structure is high. Although not bound by theory, this is considered achieved because even when the content of La in the whole rare earth magnet of the present disclosure is small, La can hardly be a constituent element of the main phase, is readily expelled into the grain boundary phase, and is likely to contribute to suppression of the generation of an $RFe_2$-type crystal structure-containing phase in the grain boundary phase.

<Total Content Ratio of $R^1$ and La>

In the formulae above, the total content ratio of $R^1$ and La is represented by y and satisfies $12.0 \leq y \leq 20.0$. Here, the value of y is a content ratio relative to the rare earth magnet of the present disclosure in the case of not causing a modifier diffused and infiltrated and corresponds to mol % (at %).

When y is 12.0 or more, the main phase ($R_2Fe_{14}B$ phase) can be obtained in a sufficient amount without allowing a large amount of αFe phase to be present. From this viewpoint, y may be 12.4 or more, 12.8 or more, 13.0 or more, 13.2 or more, 13.4 or more, or 14.0 or more. On the other hand, when y is 20.0 or less, the grain boundary phase does not become excessive. From this viewpoint, y may be 19.0 or less, 18.0 or less, 17.0 or less, 16.0 or less, or 15.0 or less.

<B>

B constitutes the main phase 10 ($R_2Fe_{14}B$ phase) in FIG. 1 and affects the abundance ratios of the main phase 10 and the grain boundary phase 20.

The content ratio of B is represented by w in the formula above. The value of w is a content ratio relative to the rare earth magnet of the present disclosure in the case of not causing a modifier diffused and infiltrated and corresponds to mol % (at %). When w is 20.0 or less, a rare earth magnet where the main phase 10 and the grain boundary phase 20 are properly present can be obtained. From this viewpoint, w may be 18.0 or less, 16.0 or less, 14.0 or less, 12.0 or less, 10.0 or less, 8.0 or less, 6.0 or less, or 5.9 or less. On the other hand, when w is 5.0 or more, generation of a large amount of a phase having $Th_2Zn_{17}$-type and/or $Th_2N_{17}$-type crystal structures hardly occurs, as a result, the formation of an $R_2Fe_{14}B$ phase is less inhibited. From this viewpoint, w may be 5.2 or more, 5.4 or more, 5.5 or more, 5.7 or more, or 5.8 or more.

<$M^1$>

$M^1$ is composed of an element that can be contained to an extent of not impairing the properties of the rare earth magnet of the present disclosure. $M^1$ may contain unavoidable impurity elements. In the present description, the unavoidable impurity elements indicate impurity elements that are inevitably contained or causes a significant rise in the production cost for avoiding its inclusion, such as impurity elements contained in raw materials of the rare earth magnet or impurity elements having mixed in the production step. The impurity element, etc. having mixed in the production step encompass an element incorporated to an extent of not affecting the magnetic properties in terms of production convenience, and the unavoidable impurity elements encompass one or more rare earth elements other than the rare earth elements selected as $R^1$ and La and inevitably getting mixed for the above-described reasons, etc.

The element $M^1$ that can be contained to an extent of not impairing the effects of the rare earth magnet of the present disclosure and the method for producing thereof includes one or more elements selected from Ga, Al, Cu, Au, Ag, Zn, In, and Mn. As long as these elements are present in an amount not more than the upper limit of the content of $M^1$, these elements substantially do not affect the magnetic properties. Accordingly, the elements above may be equated with unavoidable impurity elements. Furthermore, besides these elements, unavoidable impurity elements can be contained as $M^1$. $M^1$ is preferably one or more elements selected from the group consisting of Ga, Al and Cu, and unavoidable impurity elements.

In the formulae above, the content ratio of $M^1$ is represented by v. The value of v is a content ratio relative to the rare earth magnet of the present disclosure where a modifier is diffused and infiltrated, and corresponds to mol % (at %). When the value of v is 2.0 or less, the magnetic properties of the rare earth magnet of the present disclosure are not impaired. From this viewpoint, v may be 1.5 or less, 1.0 or less, 0.65 or less, 0.6 or less, or 0.5 or less.

As for $M^1$, it is impossible to make Ga, Al, Cu, Au, Ag, Zn, In, Mn, and unavoidable impurity elements zero, and therefore, even if the lower limit of v is 0.05, 0.1, or 0.2, there is no practical problem.

<Fe>

Fe is a main component constituting the main phase ($R_2Fe_{14}B$ phase) together with $R^1$, La, B, and the below-described Co. Part of Fe may be replaced by Co.

<Co>

Co is an element capable of replacing Fe in the main phase and the grain boundary phase. In the present description, unless otherwise indicated, when Fe is referred to, this means that part of Fe can be replaced by Co. For example, part of Fe of the $R_2Fe_{14}B$ phase is replaced by Co to form an $R_2(Fe, Co)_{14}B$ phase.

In a phase having an $RFe_2$-type crystal structure, part of Fe of the phase is replaced by Co. Although not bound by theory, in a phase having an $RFe_2$-type crystal structure where part of Fe is replaced by Co, part of R is replaced by La, as a result, the phase is very unstable. Therefore, in the rare earth magnet of the present disclosure, a phase having an $RFe_2$-type crystal structure is not present or even if it is present, the amount thereof is very small.

Due to the configuration where part of Fe is replaced by Co and the $R_2Fe_{14}B$ phase is thereby changed to an $R_2(Fe, Co)_{14}B$ phase, the Curie point of the rare earth magnet of the present disclosure increases. In turn, the magnetic properties at high temperatures, particularly, the residual magnetization at high temperatures, of the rare earth element of the present disclosure are enhanced.

<Molar Ratio of Fe and Co>

When z is 0.1 or more, enhancement of the magnetic properties at high temperatures, particularly, the residual magnetization at high temperatures, achieved due to an increase in the Curie point is substantially recognized. From this viewpoint, z may be 0.12 or more, 0.14 or more, 0.15 or more, or 0.16 or more. On the other hand, when z is 0.3 or less, the generation of a phase having an $RFe_2$-type crystal structure can be suppressed as long as the main phase is rapidly quenched to such an extent as to be nanocrystallized at the time of obtaining a magnetic ribbon or magnetic flake. From this viewpoint, z may be 0.28 or less, 0.26 or less, 0.24 or less, 0.22 or less, or 0.20 or less. In addition, since Co is expensive, the above-described range is advantageous. Here, when a modifier is diffused and infiltrated, the content ratios (molar ratios) of La and Co must satisfy a specific relationship. This is descried below.

<Relationship of Molar Ratios of La and Co>

At the time of causing a modifier diffused and infiltrated, the content ratios (molar ratio) of La and Co must satisfy a specific relationship. In the formula representing the overall composition above, the content ratio of La is represented by x, and the content ratio of Co is represented by z. As described above, during the diffusing and infiltrating a modifier, a phase having an $RFe_2$-type crystal structure is likely to be generated. In addition, containing Co facilitates the generation of a phase having an $RFe_2$-type crystal structure. From these, it is experimentally confirmed that as long as the abundance ratio (molar ratio) of La is equal, the content ratio of Co needs to be decreased and may suffice if $z \leq 2x+0.2$ is satisfied.

<Total Content Ratio of Fe and Co>

The total content ratio of Fe and Co is the remainder after removing hereinbefore-described $R^1$, La, B, and $M^1$ and is represented by $(100-y-w-v)$. As described above, the values of y, w and v are content ratios relative to the rare earth magnet of the present disclosure where a modifier is not diffused and infiltrated, and therefore, $(100-y-w-v)$ corresponds to mol % (at %). When y, w, and v are in the ranges described above, the main phase 10 and grain boundary phase 20 illustrated in FIG. 1A are obtained.

<$R^2$>

$R^2$ is an element derived from a modifier. The modifier is diffused and infiltrated into the inside of a sintered body (the rare earth magnet of the present disclosure in the case of not causing a modifier diffused and infiltrated) of a magnetic ribbon or magnetic flake. A melt of the modifier is diffused and infiltrated through the grain boundary phase 20 of FIG. 1.

$R^2$ is one or more elements selected from the group consisting of Nd, Pr, Gd, Tb, Dy and Ho. In the case of letting Nd and Pr be present together as $R^2$, didymium may be used. The modifier magnetically separates main phases from one another and thereby enhances the coercivity. Accordingly, among the above-described rare earth elements, it is preferable to contain, as $R^2$, a heavy rare earth element, particularly, Tb. For this reason, $R^2$ is preferably one or more elements selected from the group consisting of Nd and Tb.

<$M^2$>

$M^2$ is composed of a metal element which is other than a rare earth element and can be are alloyed with $R^2$, and unavoidable impurity elements. Typically, $M^2$ is composed of an alloy element and an unavoidable impurity element, which reduce the melting point of $R^2_{(1-s)}M^2_s$ to be lower than the melting point of $R^2$. $M^2$ includes, for example, one or more elements selected from Cu, Al, Co and Fe, and unavoidable impurity elements. From the viewpoint of reducing the melting point of $R^2_{(1-s)}M^2_s$, $M^2$ is preferably Cu. Incidentally, the unavoidable impurity elements indicate impurity elements that are inevitably contained or causes a significant rise in the production cost for avoiding its inclusion, such as impurity elements contained in raw materials or impurity elements having mixed in the production step. The impurity elements, etc. having mixed in the production step encompass elements incorporated to an extent of not affecting the magnetic properties in terms of production convenience, and the unavoidable impurity element encompasses one or more rare earth elements other than the rare earth element selected as $R^2$ and inevitably getting mixed for the above-described reasons, etc.

<Molar Ratios of $R^2$ and $M^2$>

$R^2$ and $M^2$ form an alloy having a composition represented, in terms of molar ratio, by the formula: $R^2_{(1-s)}M^2_s$, and the modifier contains this alloy, wherein s satisfies $0.05 \leq s \leq 0.40$.

When s is 0.05 or more, a melt of the modifier can be diffused and infiltrated into the inside of a sintered body (the rare earth magnet of the present disclosure in the case of not causing a modifier diffused and infiltrated) at a temperature where coarsening of the main phase can be avoided. From this viewpoint, s is preferably 0.10 or more, more preferably 0.15 or more. On the other hand, when s is 0.40 or less, the content of $M^2$ remaining in the grain boundary phase of the rare earth magnet of the present disclosure after causing the modifier diffused and infiltrated into the inside of a sintered body (the rare earth magnet of the present disclosure in the case of not causing a modifier diffused and infiltrated) is reduced, and this contributes to the suppression of reduction in the residual magnetization. From this viewpoint, s may be 0.35 or less, 0.30 or less, 0.25 or less, 0.20 or less, or 0.18 or less.

<Molar Ratios of Element Derived from Sintered Body and Element Derived from Modifier>

As described above, in the case of causing a modifier diffused and infiltrated, the overall composition of the rare earth magnet of the present disclosure is represented by the formula: $(R^1_{(1-x)}La_x)_y(Fe_{(1-z)}Co_z)_{(100-y-w-v)}B_wM^1_v \cdot (R^2_{(1-s)}M^2_s)_t$. In the formula, the first half $(R^1_{(1-x)}La_x)_y(Fe_{(1-z)}Co_z)_{(100-y-w-v)}B_wM^1_v$ represents a composition derived from a sintered body (rare earth magnet precursor) before causing a modifier diffused and infiltrated, and the last half $(R^2_{(1-s)}M^2_s)_t$ represents a composition derived from a modifier.

In the formula above, the ratio of the modifier relative to 100 parts by mol of the sintered body is t parts by mol. More specifically, when t parts by mol of the modifier is diffused and infiltrated into 100 parts by mol of the sintered body, this gives 100 parts by mol+t parts by mol of the rare earth magnet of the present disclosure. In other words, the rare earth magnet of the present disclosure is (100+t) mol % ((100+t) at %) relative to 100 mol % (100 at %) of the sintered body.

When t is 0.1 or more, the effect of magnetically separating main phases from one another to enhance the coercivity can be substantially recognized. From this viewpoint, t may be 0.2 or more, 0.3 or more, 0.4 or more, 0.5 or more, 0.8 or more, 1.0 or more, or 1.2 or more. On the other hand, when t is 10.0 or less, the content of $M^2$ remaining in the grain boundary phase of the rare earth magnet of the present disclosure is reduced and in turn, a reduction in the residual magnetization is suppressed. From this viewpoint, t may be 9.0 or less, 8.0 or less, 7.0 or less, 6.0 or less, 5.0 or less, 4.0 or less, 3.0 or less, 2.0 or less, 1.8 or less, 1.6 or less, or 1.4 or less.

As illustrated in FIG. 1, the rare earth magnet 100 of the present disclosure has a main phase 10 and a grain boundary phase 20. The main phase 10 and the grain boundary phase 20 are described below.

<Main Phase>

The main phase has an $R_2Fe_{14}B$-type crystal structure. R is a rare earth element. The reason why the crystal structure is referred to as $R_2Fe_{14}B$"-type" is because in the main phase (in the crystal structure), elements other than R, Fe and B can be contained in a substitution-type and/or interstitial-type manner. For example, in the rare earth magnet of the present disclosure, part of Fe is replaced by Co in the main phase. Co may be present as an interstitial-type element in the main phase. Furthermore, in the rare earth magnet of the present disclosure, part of any one element of R, Fe, Co and B in the main phase may be replaced by $M^1$. Alternatively, for example, $M^1$ may be present as an interstitial-type element in the main phase.

The main phase is nanocrystallized. The phrase "the main phase is nanocrystallized" means that the average particle diameter of the main phase is less than 1.0 μm. The rare earth magnet of the present disclosure is obtained, as described later, by pressure-sintering a magnetic ribbon or magnetic flake with the main phase being nanocrystallized. The magnetic ribbon or magnetic flake is obtained by rapidly quenching a molten alloy, and when the molten alloy is rapidly quenched to such an extent as to nanocrystallize the main phase, generation of a phase having an $RFe_2$-type crystal structure can be suppressed. From this viewpoint, the average particle diameter of the main phase may be 0.05 μm or more, 0.10 μm or more, 0.20 μm or more, 0.30 μm or more, 0.40 μm or more, or 0.50 μm or more, and may be 0.90 μm or less, 0.80 μm or less, 0.70 μm or less, or 0.60 μm or less.

The "average particle diameter" is measured as follows. In a scanning electron microscopic image or a transmission electron microscopic image, a given region observed from a direction perpendicular to the magnetization easy axis is defined, and after a plurality of lines extending in a direction perpendicular to the magnetization easy axis are drawn on main phases present in the given region, the diameter (length) of the main phase is calculated from the distance between intersecting points within particles of the main phase (intercept method). In the case where the cross-section of the main phase is nearly circular, the diameter is calculated in terms of a projection-area equivalent-circle diameter. In the case where the cross-section of the main phase is nearly rectangular, the dimeter conversion is effected by rectangle approximation. The value of $D_{50}$ of the thus-obtained diameter (length) distribution (grain size distribution) is the average particle diameter.

<Grain Boundary Phase>

As illustrated in FIG. 1, the rare earth magnet 100 of the present disclosure has a main phase 10 and a grain boundary phase 20 present around the main phase 10. As described above, the main phase 10 contains a magnetic phase ($R_2Fe_{14}B$ phase) having an $R_2Fe_{14}B$-type crystal structure. On the other hand, the grain boundary phase 20 contains a phase with the crystal structure being indistinct, including a phase having a crystal structure other than the $R_2Fe_{14}B$ type. Although not bound by theory, the "indistinct phase" means a phase (state) in which at least part of phases have an incomplete crystal structure and these phases are irregularly present, or means a phase in which at least part of the phase (state) above almost fails to present the appearance of a crystal structure as if it is an amorphous phase. With respect to the phases present in the grain boundary phase 20, in both a phase have a crystal structure other than the $R_2Fe_{14}B$ type and a phase with the crystal structure being indistinct, the existing ratio of R is higher than in a phase having an $R_2Fe_{14}B$-type crystal structure. For this reason, the grain boundary phase 20 is sometimes referred to as an "R-rich phase", a "rare earth element-rich phase", or a "rare earth-rich phase".

As illustrated in FIG. 1 and FIG. 8, both the rare earth magnet 100 of the present disclosure and the conventional rare earth magnet 200 have a main phase 10 and a grain boundary phase 20. In addition, the grain boundary phase 20 has an adjacent part 22 and a triple point 24.

In both a case where a molten alloy having a composition of the rare earth magnet 100 of the present disclosure is solidified and a case where a molten alloy having a composition of the conventional rare earth magnet 200 is solidified, common is that when the main phase 10 is generated, the residual melt is present in the adjacent part 22 and the triple point 24. However, the phase generated as a result of solidification of the residual melt differs between a case of solidifying a molten alloy having a composition of the rare earth magnet 100 of the present disclosure and a case of solidifying a molten alloy having a composition of the conventional rare earth magnet 200.

In the case of solidifying a molten alloy having a composition of the conventional rare earth magnet 200, the main phase 10 is quenched to such an extent as to allow the growth in size to a micro level, and therefore many phases having an $RFe_2$-type crystal structure are generated in the adjacent part 22. In the adjacent part 22, in addition to a phase having an $RFe_2$-type crystal structure, a phase having a crystal structure other than $R_2Fe_{14}B$ type and $RFe_2$ type, where the existing ratio of R is higher than in the phase having an $R_2Fe_{14}B$-type crystal structure, is present. In the triple point 24, many phases having a crystal structure other than $R_2Fe_{14}B$ type and $RFe_2$ type, where the existing ratio of R is higher than in the phase having an $R_2Fe_{14}B$-type crystal structure, are present. On the other hand, in the case of solidifying a molten alloy having a composition of the rare earth magnet 100 of the present disclosure, many phases having a crystal structure other than $R_2Fe_{14}B$ type, where the existing ratio of R is higher than in the phase having an $R_2Fe_{14}B$-type crystal structure, are generated in both the adjacent part 22 and the triple point 24. However, since the molten alloy having a composition of the rare earth magnet 100 of the present disclosure is rapidly quenched to the extent that the main phase 10 is nanocrystallized, in both the adjacent part 22 and the triple point 24, a phase having an $RFe_2$-type crystal structure is not generated, or even if it is generated, the generation amount thereof is very small.

The abundance (generation amount) of a phase having an $RFe_2$-type crystal structure is evaluated by the volume ratio of a phase having an $RFe_2$-type crystal structure relative to the grain boundary phase. The volume ratio of a phase having an $RFe_2$-type crystal structure is determined as follows. The volume fraction of a phase having an $RFe_2$- type crystal structure is determined by subjecting an X-ray diffraction pattern of the rare earth magnet of the present disclosure to Rietveld analysis. In addition, the volume fraction of the main phase is calculated from the content ratios of the rare earth element and boron. Then, assuming the phases other than the main phase in the rare earth magnet of the present disclosure are a grain boundary phase, the volume fraction of the grain boundary phase is calculated. From these, (volume fraction of phase having $RFe_2$-type crystal structure)/(volume fraction of grain boundary phase) is calculated, and the obtained value is defined as the volume ratio of a phase having an $RFe_2$-type crystal structure relative to the grain boundary phase.

In the rare earth magnet of the present disclosure, the volume ratio of a phase having an $RFe_2$-type crystal structure is 0.40 or less relative to the grain boundary phase. Since the squareness is deteriorated due to the presence of a phase having an $RFe_2$-type crystal structure, the volume ratio of a phase having an $RFe_2$-type crystal structure is preferably as low as possible. Therefore, when the volume ratio is 0.40 or less, 0.30 or less, 0.22 or less, 0.19 or less, 0.14 or less, 0.13 or less, or 0.10 or less, the squareness ratio is 0.6 or more, and the squareness is excellent. On the other hand, in view of squareness, the volume ratio of a phase having an $RFe_2$-type crystal structure is ideally 0. However, as long as the upper limit of the volume ratio of a phase having an $RFe_2$-type crystal structure satisfies the above-described value, even when the volume ratio of a phase having an $RFe_2$-type crystal structure is 0.01 or more, 0.02 or more, 0.03 or more, 0.04 or more, or 0.05 or more, there is no practical problem. Incidentally, the squareness ratio is Hr/Hc. He is the coercivity, and Hr is the magnetic field at a 5% demagnetization. The magnetic field at a 5% demagnetization means a magnetic field of a second quadrant (demagnetization curve) of a hysteresis curve when the magnetization is reduced by 5% from the residual magnetization (the magnetic field when the applied magnetic field is 0 kA/m).

<<Method for Producing>>

The method for producing a rare earth magnet of the present disclosure is described below.

The method for producing a rare earth magnet of the present disclosure includes respective steps of preparation of a molten alloy, cooling of the molten alloy, and pressure sintering. A sintered body obtained by pressure sintering may be used as the rare earth magnet of the present disclosure, or the sintered body may be subjected to hot plastic working and then used as the rare earth magnet of the present disclosure. Also, a modifier may be diffused and infiltrated into the sintered body before hot plastic working, and the resulting sintered body may be used as the rare earth magnet of the present disclosure. Alternatively, a modifier may be diffused and infiltrated into the sintered body after hot plastic working, and the resulting sintered body may be used as the rare earth magnet of the present disclosure. From the viewpoint that a rare earth magnet having anisotropy and excellent in both the residual magnetization and the coercivity is obtained, it is preferable to, typically, apply hot plastic working to a sintered body obtained by pressure sintering and furthermore, cause a modifier diffused and infiltrated into the sintered body after hot plastic working. In the case of applying hot plastic working and/or diffusive penetration of a modifier, besides respective steps described above, respective steps of hot plastic working, and preparation and diffusive penetration of a modifier are added. In the following, each step is described.

<Preparation of Molten Alloy>

A molten alloy having a composition represented, in terms of molar ratio, by the formula: $(R^1_{(1-x)}La_x)_y(Fe_{(1-z)}Co_z)_{(100-y-w-v)}B_wM^1_v$ is prepared. In the formulae, $R^1$, La, Fe, Co, B, $M^1$, x, y, z, w, and v are as described in "<<Rare Earth Magnet>>". With respect to elements that may naturally decrease in the subsequent process, the composition may anticipate such natural decrease.

<Cooling of Molten Alloy>

The molten alloy having the above-described composition is cooled at a rate of $5\times10^5$ to $5\times10^{7}$° C./sec (rapid quenching). Cooling at such a rate (rapid quenching) enables obtaining a magnetic ribbon or magnetic flake, in which the main phase is nanocrystallized and generation of a phase having an $RFe_2$-type crystal structure is suppressed. The nanocrystallized phase can also be obtained by nanocrystallizing an amorphous by heat of pressure sintering at the time of pressure-sintering an amorphized magnetic ribbon or magnetic flake, but in this case, many phases having an $RFe_2$-type crystal structure are also generated. When the cooling rate of the molten alloy is $5\times10^{7}$° C./sec or less, the magnetic ribbon or magnetic flake is not amorphized. In order to obtain a nanocrystallized main phase while cooling (rapidly quenching) the molten alloy, after setting the cooling rate of the molten alloy to $5\times10^{7}$° C./sec or less, the molten alloy is cooled (rapidly quenched) at a rate of $5\times10^{5}$° C./sec or more or $1\times10^{6}$° C./sec or more.

As long as the molten alloy can be cooled at the rate above, the method therefor is not particularly limited but, typically, the method includes a liquid quenching method, etc. The method similar to the liquid quenching method includes a strip casting method. By rotating a cooling roll for the strip casting method at a higher speed than usual, the same effects as those of a liquid quenching method are obtained. Each of the liquid quenching method and the strip casting method is described briefly by referring to the drawings.

Figure 2:
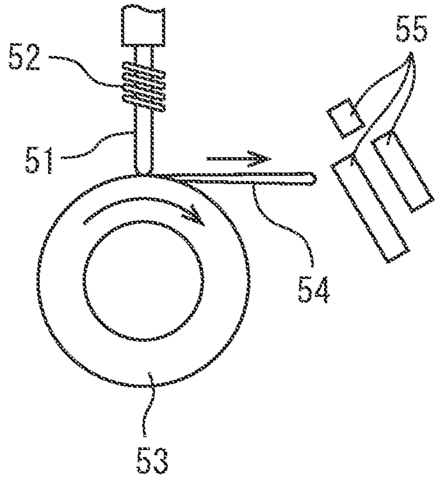
FIG. 2 is an explanatory diagram schematically illustrating a cooling apparatus used for a liquid quenching method.

FIG. 2 is an explanatory diagram schematically illustrating a cooling apparatus used for a liquid quenching method.

A liquid quenching apparatus 50 has a spray nozzle 51, a heater 52, and a cooling roll 53. The spray nozzle 51 is disposed to face the outer peripheral surface of the cooling roll 53. A molten alloy is sprayed from the spray nozzle 51 on the outer peripheral surface of the high-speed rotating cooling roll 53, and the molten alloy is cooled to obtain a magnetic ribbon 54. Depending on the rotational speed of the cooling roll and/or the spraying conditions, a magnetic flake 55 can be obtained. Compared with the later-described strip casting apparatus, in the liquid quenching apparatus 50, a molten alloy is sprayed directly on the outer peripheral surface of the cooling roll 53 from the spray nozzle 51, so that the molten alloy can be rapidly quenched.

A molten alloy may be fed to the spray nozzle 51, or after charging raw materials of a molten alloy into the spray nozzle 51, the raw materials may be melted using the heater 52.

The cooling roll 53 is formed of a material having high thermal conductivity, such as copper or chromium, and the surface of the cooling roll 53 is subjected to chromium plating, etc. so as to prevent corrosion from the high-temperature molten alloy. The cooling roll 53 can be rotated by a drive unit (not shown) at a predetermined rotational speed in the arrow direction.

For cooling the molten alloy at the above-described speed, the peripheral velocity of the cooling roll 53 may be from 15 to 30 m/s. The atmosphere when cooling the molten alloy by using a liquid quenching method is preferably an inert gas atmosphere so as to prevent oxidation, etc. of the molten alloy. The inert gas atmosphere encompasses a nitrogen gas atmosphere.

The temperature of the molten alloy when sprayed on the outer peripheral surface of the cooling roll 53 from the spray nozzle 51 may be 1,350° C. or more, 1,400° C. or more, or 1,450° C. or more, and may be 1,600° C. or less, 1,550° C. or less, or 1,500° C. or less.

Figure 3:
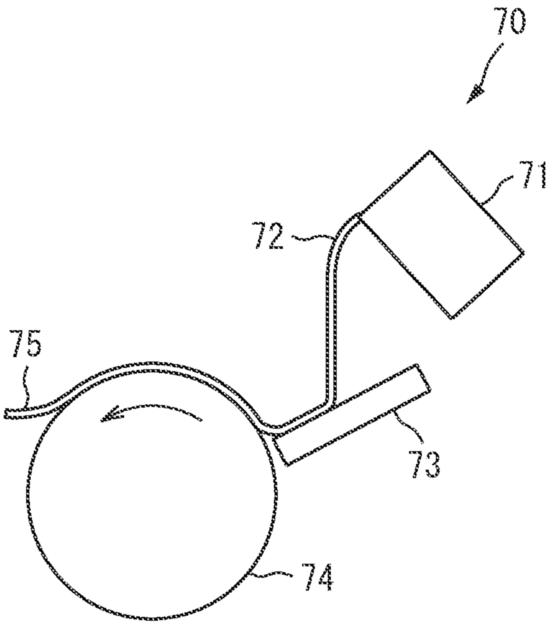
FIG. 3 is an explanatory diagram schematically illustrating a cooling apparatus used for a strip casting method.

FIG. 3 is an explanatory diagram schematically illustrating a cooling apparatus used for a strip casting method.

A strip casting apparatus 70 has a melting furnace 71, a tundish 73, and a cooling roll 74. Raw materials are melted in the melting furnace 71 to prepare a molten alloy 72 having the above-described composition The molten alloy 72 is fed at a constant feed rate to the tundish 73. The molten alloy 72 fed to the tundish 73 is fed by its self-weight from the edge of the tundish 73 to the cooling roll 74.

The tundish 73 is composed of ceramic, etc. and can temporarily store the molten alloy 72 continuously fed at a predetermined flow rate from the melting furnace 71 and regulate the flow of the molten alloy 72 to the cooling roll 74. The tundish 73 additionally has a function of adjusting the temperature of the molten alloy 72 immediately before reaching the cooling roll 74.

The cooling roll 74 is formed of a material having high thermal conductivity, such as copper or chromium, and the surface of the cooling roll 74 is subjected to chromium plating, etc. so as to prevent corrosion from the high-temperature molten alloy. The cooling roll 74 is rotated by a drive unit (not shown) at a predetermined rotational speed in the arrow direction.

For achieving the above-described cooling rate, the peripheral velocity of the cooling roll 74 may be from 20 to 40 m/s.

The temperature of the molten alloy when fed to the cooling roll 74 from the edge of the tundish 73 may be 1,350° C. or more, 1,400° C. or more, or 1,450° C. or more, and may be 1,600° C. or less, 1,550° C. or less, or 1,500° C. or less.

The molten alloy 72 cooled and solidified on the outer periphery of the cooling roll 74 turns into a magnetic alloy 75 and is separated from the cooling roll 74 and collected in a collection unit (not shown). The form of the magnetic alloy 75 is typically a ribbon or a flake. The atmosphere at the time of cooling the molten alloy by using a strip casting method is preferably an inert gas atmosphere so as to prevent oxidation, etc. of the molten alloy. The inert gas atmosphere encompasses a nitrogen gas atmosphere.

<Pressure Sintering>

The magnetic ribbon or magnetic flake is pressure-sintered to obtain a sintered body. Compared with pressureless sintering, in the pressure sintering, pressurization is applied, and the magnetic ribbon or magnetic flake can thereby be sintered at a relatively low temperature in a short time. This enables obtaining a sintered body without causing coarsening of the nanocrystallized main phase while suppressing the generation of a phase having an $RFe_2$-type crystal structure. In addition, compared with the later-described diffusive penetration temperature of a modifier, the pressure sintering temperature is a high temperature. Accordingly, the surface part of the main phase and the grain boundary phase are in a liquid phase during pressure sintering and therefore, when the sintered body is immediately cooled after pressure sintering, a phase having an $RFe_2$-type crystal structure can hardly be generated.

The conditions in the pressure sintering may be appropriately determined as long as the main phase is not coarsened and generation of a phase having an $RFe_2$-type crystal structure can be suppressed. The pressure sintering temperature may be, for example, 470° C. or more, 500° C. or more, 550° C. or more, or 630° C. or more, and may be 750° C. or less, 700° C. or less, 670° C. or less, or 650° C. or less. The pressure in pressure sintering may be, for example, 50 MPa or more, 100 MPa or more, 150 MPa or more, 200 MPa or more, or 350 MPa or more, and may be 600 MPa or less, 500 MPa or less, 450 MPa or less, or 400 MPa or less. The pressure sintering time may be, for example, 5 minutes or more, 10 minutes or more, 15 minutes or more, 30 minutes or more, or 60 minutes or more, and may be 150 minutes or less, 120 minutes or less, or 90 minutes or less. After the completion of pressure sintering, the sintered body is taken out of the sintering mold, and the sintered body is immediately cooled, whereby generation of a phase having and $RFe_2$-type crystal structure can be suppressed. The cooling rate may be, for example, 10° C./min or more, 30° C./min or more, or 50° C./min or more, and may be 1,000° C./min or less, 800° C./min or less, 600° C./min or less, 400° C./min or less, 200° C./min or less, 100° C./min or less, 80° C./min or less, or 70° C./min or less. In order to suppress oxidation of a magnetic ribbon or a magnetic flake during pressure sintering, the pressure sintering atmosphere is preferably an inert gas atmosphere. The inert gas atmosphere encompasses a nitrogen gas atmosphere.

Since the magnetic ribbon or magnetic flake having a nanocrystallized main phase is very thin, the magnetic ribbon or magnetic flake is crushed by the charging into a pressure sintering mold and/or the pressure sintering operation, but the magnetic ribbon or magnetic flake may be previously crushed before pressure sintering. For the crushing, for example, a pin mill, a cutter mill, a ball mill, and a jet mill, etc. may be used.

<Hot Plastic Working>

The sintered body obtained by pressure sintering may be subjected to hot plastic working. By this operation, anisotropy can be imparted to the rare earth magnet of the present disclosure. The hot plastic working is performed for a short time at a temperature higher than the temperature where a phase having an $RFe_2$-type crystal structure is likely to be generated, and after the hot plastic working, the sintered body is immediately cooled. Consequently, generation of a phase having an $RFe_2$-type crystal structure can be suppressed, and coarsening of the main phase is also avoidable.

The conditions in the hot plastic working may be appropriately determined as long as anisotropy is imparted to the sintered body, the main phase is not coarsened, and generation of a phase having an $RFe_2$-type crystal structure can be suppressed. The hot plastic working temperature may be, for example, 750° C. or more, 770° C. or more, or 790° C. or more, and may be 850° C. or less, 830° C. or less, or 800° C. or less. The hot plastic working pressure may be, for example, 50 MPa or more, 100 MPa or more, 200 MPa or more, 500 MPa or more, 700 MPa or more, or 900 MPa or more, and may be 3,000 MPa or less, 2,500 MPa or less, 2,000 MPa or less, 1,500 MPa or less, or 1,000 MPa or less. The rolling reduction may be 10% or more, 30% or more, 50% or more, 60% or more, and may be 80% or less, 75% or less, 70% or less, or 65% or less. The strain rate at the hot plastic working may be 0.01/s or more, 0.1/s or more, 1.0/s or more, or 3.0/s or more, and may be 15.0/s or less, 10.0/s or less, or 5.0/s or less.

After the completion of hot plastic working, the sintered body is immediately cooled, and generation of a phase having an $RFe_2$-type crystal structure can thereby be suppressed. The cooling rate may be, for example, 10° C./min or more, 30° C./min or more, or 50° C./min or more, and may be 1,000° C./min or less, 800° C./min or less, 600° C./min or less, 400° C./min or less, 300° C./min or less, 200° C./min or less, 100° C./min or less, or 70° C./min or less. In order to suppress oxidation of the sintered body during hot working, the hot plastic working atmosphere is preferably an inert gas atmosphere. The inert gas atmosphere encompasses a nitrogen gas atmosphere.

<Preparation of Modifier>

A modifier having a composition represented, in terms of molar ratio, by the formula: $R^2_{(1-s)}M^2_s$ is prepared. In the formula representing the composition of the modifier, $R^2$, $M^2$ and s are as described in "<<Rare Earth Magnet>>".

The method for preparing the modifier includes, for example, a method where a ribbon and/or a flake, etc. is obtained from a molten alloy having a composition of the modifier by using a liquid quenching method or a strip casting method, etc. This method is advantageous in that since the molten alloy is quenched, segregation is less likely to occur in the modifier. In addition, the method for preparing the modifier includes, for example, a method where a molten alloy having a composition of the modifier is cast in a casting mold such as book mold, etc. In this method, a large amount of modifier is relatively easily obtained. In order to reduce the segregation of the modifier, the book mold is preferably made of a material having a high thermal conductivity. Also, the cast material is preferably heat-treated for homogenization so as to suppress segregation. Furthermore, the method for preparing the modifier includes a method where raw materials of the modifier are charged into a container, the raw materials are arc-melted in the container, and the melted product is cooled to obtain an ingot. In this method, even when the melting point of the raw material is high, the modifier can relatively easily be obtained. From the viewpoint of reducing segregation of the modifier, the ingot is preferably heat-treated for homogenization.

<Diffusing and Infiltrating>

The modifier is diffused and infiltrated into the sintered body obtained by sintering the magnetic ribbon or magnetic flake. Alternatively, the sintered body obtained by sintering the magnetic ribbon or magnetic flake is subjected to hot plastic working, and the modifier is diffused and infiltrated into the sintered body after the hot plastic working. As the method for diffusing and infiltrating, typically, the modifier is put into contact with the sintered body to obtain a contact body, and the contact body is heated to cause diffusing and infiltrating of a melt of the modifier into the inside of the sintered body The melt of the modifier is diffused and infiltrated through the grain boundary phase 20 in FIG. 1. Then, the melt of the modifier solidifies in the grain boundary phase 20 to magnetically separate main phases 10 from one another, as a result, the coercivity, particularly, the coercivity at high temperatures, is enhanced.

The mode of the contact body is not particularly limited as long as the modifier is in contact with the sintered body. The mode of the contact body includes, for example, a mode where a modifier ribbon and/or flake obtained by a strip casting method is brought into contact with the sintered body, and a mode where a modifier powder obtained by pulverizing a strip cast material, a book molded material and/or an arc-melted/solidified material is brought into contact with the sintered body.

The diffusing and infiltrating conditions are not particularly limited as long as they are conditions where the modifier is diffused and infiltrated into the inside of the sintered body, the main phase is not coarsened, and generation of a phase having an $RFe_2$-type crystal structure is not significantly promoted. As described above, the temperature range where the modifier is diffused and infiltrated into the inside of the sintered body while avoiding coarsening of the main phase overlaps with the temperature range where a phase having an $RFe_2$-type crystal structure is likely to be generated. For this reason, with respect to the composition of the sintered body, i.e., the composition of the molten alloy prepared when obtaining the sintered body, x and z in the formula representing the overall composition of the molten alloy should satisfy the relationship of $z \leq 2x+0.2$. The technical significance of $z \leq 2x+0.2$ is as described in "<<Rare Earth Magnet>>".

The diffusing and infiltrating temperature may be, for example, 550° C. or more, 600° C. or more, or 650° C. or more and may be 750° C. or less, 740° C. or less, 730° C. or less, 720° C. or less, 710° C. or less, or 700° C. or less. The diffusing and infiltrating time may be 30 minutes or more, 60 minutes or more, 90 minutes or more, or 120 minutes or more, and may be 300 minutes or less, 240 minutes or less, 210 minutes or less, 180 minutes or less, 165 minutes or less, or 150 minutes or less. After the diffusing and infiltrating of the modifier, the sintered body is preferably cooled immediately. This can suppress the generation of a phase having an $RFe_2$-type crystal structure. The cooling rate may be, for example, 10° C./min or more, 30° C./min or more, or 50° C./min or more, and may be 1,000° C./min or less, 800° C./min or less, 600° C./min or less, 400° C./min or less, 300° C./min or less, 200° C./min or less, 100° C./min or less, or 70° C./min or less. In order to prevent the sintered body from oxidation during diffusing and infiltrating, the diffusing and infiltrating atmosphere is preferably an inert gas atmosphere. The inert gas atmosphere encompasses a nitrogen gas atmosphere.

At the time of diffusive penetration of the modifier, t parts by mol of the modifier is put into contact with the sintered body per 100 parts by mol of the sintered body. t is as described in "<<Rare Earth Magnet>>".

Since the modifier is diffused and infiltrated at a temperature where the main phase of the sintered body is not coarsened, the average particle diameter of main phases before the diffusing and infiltrating of the modifier and the average particle diameter of main phases after the diffusing and infiltrating of the modifier are substantially in the same size range. The average particle diameter and crystal structure of the main phase are as described in "<<Rare Earth Magnet>>".

During the diffusing and infiltrating of the modifier, the diffusing and infiltrating atmosphere is preferably an inert gas atmosphere so as to prevent the sintered body and the modifier from oxidation. The inert gas atmosphere encompasses a nitrogen gas atmosphere.

<Modification>

Other than those described hereinbefore, in the rare earth magnet of the present disclosure and the method for producing thereof, various modifications can be added within the scope of contents as set forth in claims. For example, so-called optimization heat treatment may be performed before or after hot plastic working or before or after diffusing and infiltrating of the modifier. The optimization heat treatment is a heat treatment for controlling the microstructure of the rare earth magnet of the present disclosure, particularly, the grain boundary phase structure, and can further enhance the residual magnetization, coercivity and squareness. The optimization heat treatment temperature may be, for example, 470° C. or more, 550° C. or more, or 600° C. or more, and may be 750° C. or less, 730° C. or less, or 700° C. or less. The optimization heat treatment time may be, for example, 5 minutes or more, 15 minutes or more, 60 minutes or more, or 120 minutes or more, and may be 300 minutes or less, 240 minutes or less, 210 minutes or less, 180 minutes or less, 165 minutes or less, or 150 minutes or less. After the completion of the optimization heat treatment, the sintered body is immediately cooled. This can suppress generation of a phase having an $RFe_2$-type crystal structure. The cooling rate may be, for example, 10° C./min or more, 30° C./min or more, or 50° C./min or more, and may be 2,000° C./min or less, 1,000° C./min or less, or 500° C./min or less. In order to suppress oxidation of the magnet during optimization heat treatment, the optimization heat treatment atmosphere is preferably an inert gas atmosphere. The inert gas atmosphere encompasses a nitrogen gas atmosphere.

EXAMPLES

The rare earth magnet of the present disclosure and the method for producing thereof are described more specifically below by referring to Examples and Comparative Examples. Note that the rare earth magnet of the present disclosure and the method for producing thereof are not limited to the conditions employed in the following Examples.

<<Preparation of Sample>>

The samples of Examples 1 to 18 and Comparative Examples 1 to 9 were prepared according to the following procedure. Incidentally, the samples of Examples 1 to 10 and Comparative Examples 1 to 4 are samples in which a modifier was not diffused and infiltrated, and the samples of Examples 11 to 17 and Comparative Examples 5 to 8 are samples in which a modifier was diffused and infiltrated.

Preparation of Samples of Examples 1 to 10 and Comparative Examples 1, 2 and 4

A liquid quenched material (magnetic ribbon) having a composition shown in Table 1 was prepared. The liquid quenching apparatus 50 illustrated in FIG. 2 was used for the preparation. The peripheral velocity of the cooling roll 53 was 20 m/s in Examples 1 to 10 and Comparative Examples 1 and 2. In Comparative Example 4, the peripheral velocity was 40 m/s. The liquid quenched material was coarsely pulverized and then pressure-sintered. The cooling rate of the molten alloy was as shown in Table 1. At the time of pressure sintering, the temperature was 600° C., the pressure was 400 MPa, and the pressure sintering time was 15 minutes.

The pressure sintering was followed by cooling at 200° C./min to room temperature to obtain a sintered body. This sintered body was subjected to hot plastic working. The hot plastic working temperature was 750° C., the hot plastic working pressure was 100 MPa, the strain rate was 0.1/s, the rolling reduction was 75%, and the cooling rate after hot plastic working was 300° C./min.

Preparation of Samples of Examples 11 to 18 and Comparative Examples 5 to 9

A modifier was diffused and infiltrated into a sintered body having a composition shown in Table 2 after hot plastic working. An alloy having a composition of $Nd_{0.6}Tb_{0.2}Cu_{0.2}$ (molar ratio) was used as the modifier, and the modifier was diffused and infiltrated into the sintered body at 700° C. over 165 minutes. The cooling rate after the diffusing and infiltrating was 100° C./min. The sintered body after hot plastic working was prepared in the same manner as in Examples 1 to 10.

Preparation of Samples of Comparative Examples 3 and 8

A strip cast material (magnetic ribbon) having a composition shown in Table 1 was prepared. The strip casting apparatus 70 illustrated in FIG. 3 was used for the preparation. The peripheral velocity of the cooling roll 74 was 1 m/s, and the strip cast material was coarsely pulverized by hydrogen embrittlement and then further pulverized using a jet mill to obtain a magnetic powder. At the time of cooling the molten alloy by using a strip casting method, the cooling rate of the molten alloy was $10^3$° C./sec. Furthermore, the particle diameter of the magnetic powder was 3.0 μm in terms of $D_{50}$. The magnetic powder was subjected to pressureless sintering (pressureless liquid phase sintering) at 1,050° C. over 4 hours and then cooled to room temperature at a rate of 100° C./min to obtain a sintered body. This sintered body was used as the sample of Comparative Example 3.

With respect to the sample of Comparative Example 8, a modifier was diffused and infiltrated into a sintered body having been subjected to sintering and then cooled to room temperature. An alloy having a composition of $Nd_{0.6}Tb_{0.2}Cu_{0.2}$ (molar ratio) was used as the modifier, and the modifier was diffused and infiltrated into the sintered body at 950° C. over 165 minutes. The cooling rate after the diffusing and infiltrating was 1° C./min.

<<Evaluation>>

The magnetic properties of each sample were measured at 27° C. (300 K) and 180° C. (453 K) using Vibrating Sample Magnetometer (VSM). The residual magnetization at 180° C. was evaluated by the temperature coefficient of residual magnetization. The temperature coefficient of residual magnetization is a value calculated according to the formula: [{(residual magnetization at 180° C.)−(residual magnetization at 27° C.)}/(180° C.−27° C.)]×100. As the absolute value of the temperature coefficient of residual magnetization is smaller, the reduction in the residual magnetization at high temperatures is lesser, and the absolute value of the temperature coefficient of residual magnetization is preferably 0.1 or less.

Each sample was determined for the average particle dimeter of main phases by performing SEM (Scanning Electron Microscope) observation. In addition, each sample was determined for the volume fraction of a phase having an $RFe_2$-type crystal structure by performing an X-ray diffraction analysis, and furthermore, a volume ratio of a phase having an $RFe_2$-type crystal structure relative to the grain boundary phase was determined by the method described in "<<Rare Earth Magnet>>".

Figure 4:
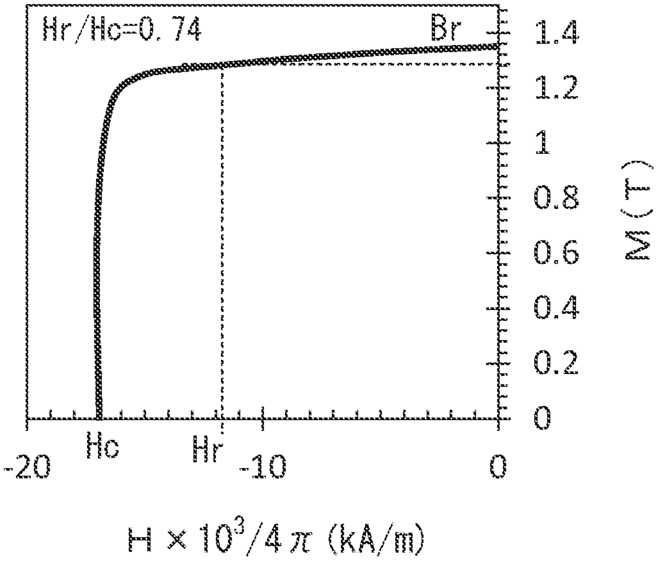
FIG. 4 is a graph illustrating a demagnetization curve of the sample of Example 2.
Figure 5:
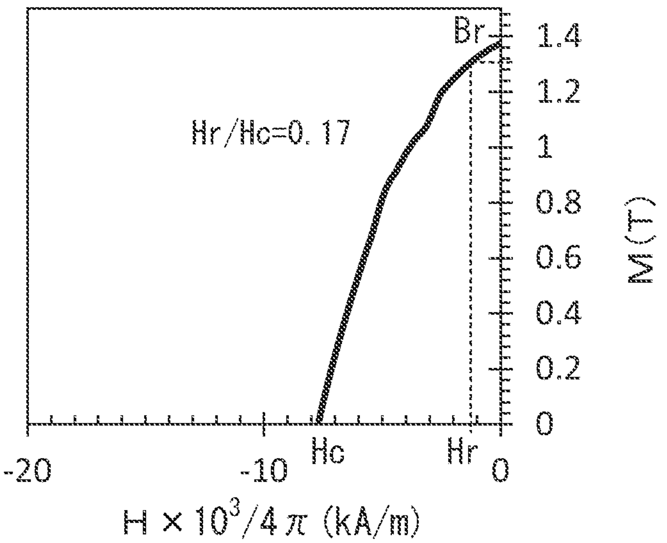
FIG. 5 is a graph illustrating a demagnetization curve of the sample of Comparative Example 3.
Figure 6:
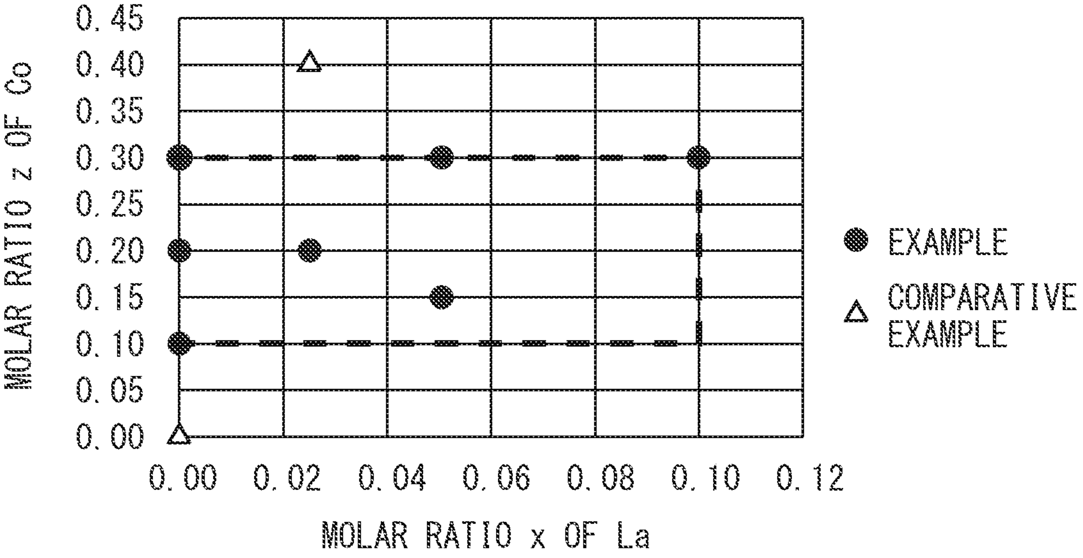
FIG. 6 is a graph illustrating the relationship between the molar ratio x of La and the molar ratio z of Co with respect to the samples of Examples 1 to 10 and Comparative Examples 1 to 4 (samples without diffusing and infiltrating a modifier).
Figure 7:
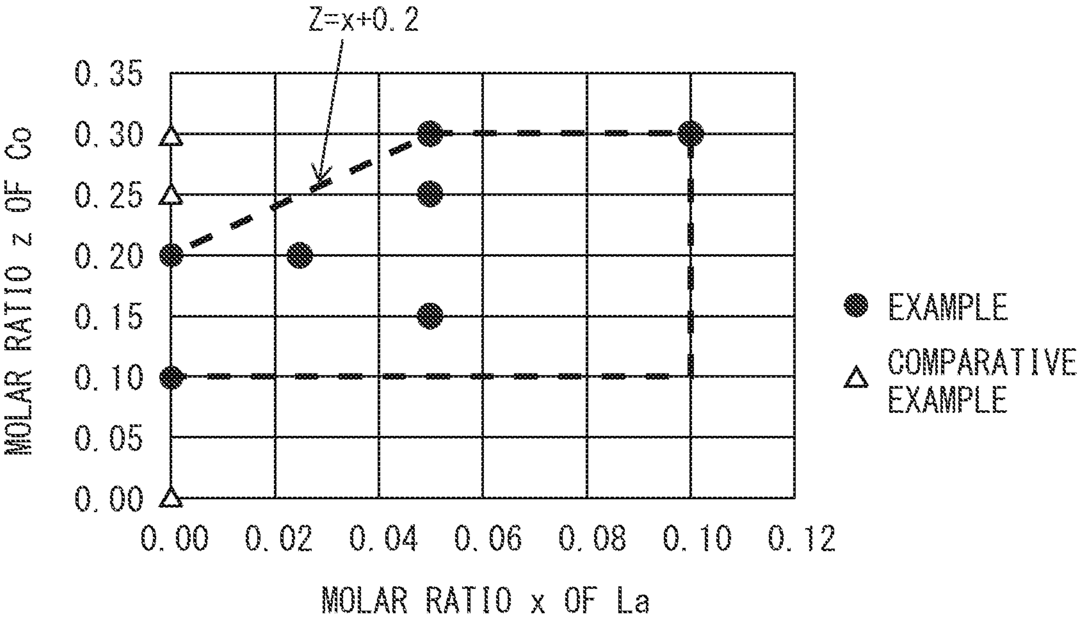
FIG. 7 is a graph illustrating the relationship between the molar ratio x of La and the molar ratio z of Co with respect to the samples of Examples 11 to 17 and Comparative Examples 5 to 8 (samples with diffusing and infiltrating a modifier).

The results are shown in Tables 1-1 and 1-2 and Tables 2-1 and 2-2. Tables 1-1 and 1-2 show the results of samples in which a modifier was not diffused and infiltrated, and Tables 2-1 and 2-2 show the results of samples in which a modifier was diffused and infiltrated. In these Tables, "1-2 Phase" means "a phase having an $RFe_2$-type crystal structure". FIG. 4 is a graph illustrating a demagnetization curve of the sample of Example 2. FIG. 5 is a graph illustrating a demagnetization curve of the sample of Comparative Example 3. FIG. 6 is a graph illustrating the relationship between the molar ratio x of La and the molar ratio z of Co with respect to the samples (samples without diffusive penetration of a modifier) of Examples 1 to 10 and Comparative Examples 1 to 4. FIG. 7 is a graph illustrating the relationship between the molar ratio x of La and the molar ratio z of Co with respect to the samples (samples with diffusive penetration of a modifier) of Examples 11 to 17 and Comparative Examples 5 to 8.

TABLE 1-1

| | Composition of Rare Earth Magnet (molar ratio) | Molar Ratio x of La | Molar Ratio z of Co | z ≤ 2x + 0.2 | Production Method | Cooling Rate of Molten Alloy (° C./s) |
|---|---|---|---|---|---|---|
| Comparative Example 1 | $Nd_{13.4}Fe_{bal}B_6Cu_{0.1}Al_{0.1}Ga_{0.3}$ | 0 | 0 | 0.20 | hot-plastic worked magnet | 2000000 |
| Example 1 | $Nd_{13.4}Fe_{bal}Co_{8.1}B_6Cu_{0.1}Al_{0.1}Ga_{0.3}$ | 0 | 0.10 | 0.20 | hot-plastic worked magnet | 2000000 |
| Example 2 | $Nd_{13.4}Fe_{bal}Co_{16}B_6Cu_{0.1}Al_{0.1}Ga_{0.3}$ | 0 | 0.20 | 0.20 | hot-plastic worked magnet | 2000000 |
| Example 3 | $Nd_{13.4}Fe_{bal}Co_{24}B_6Cu_{0.1}Al_{0.1}Ga_{0.3}$ | 0 | 0.30 | 0.20 | hot-plastic worked magnet | 2000000 |
| Example 4 | $Nd_{12.8}La_{0.6}Fe_{bal}Co_{24}B_6Cu_{0.1}Al_{0.1}Ga_{0.3}$ | 0.050 | 0.30 | 0.30 | hot-plastic worked magnet | 2000000 |
| Example 5 | $Nd_{12.4}La_{0.6}Fe_{bal}Co_{12.1}B_{5.7}Cu_{0.1}Al_{0.2}Ga_{0.3}$ | 0.050 | 0.15 | 0.30 | hot-plastic worked magnet | 2000000 |
| Example 6 | $Nd_{12.9}La_{0.3}Fe_{bal}Co_{15.5}B_{5.8}Cu_{0.1}Al_{0.1}Ga_{0.3}$ | 0.025 | 0.20 | 0.25 | hot-plastic worked magnet | 2000000 |
| Example 7 | $Nd_{12.1}La_{1.3}Fe_{bal}Co_{24.5}B_{5.8}Cu_{0.1}Al_{0.1}Ga_{0.3}$ | 0.100 | 0.30 | 0.40 | hot-plastic worked magnet | 2000000 |
| Example 8 | $Nd_{13.3}Fe_{bal}Co_{15.5}B_6$ | 0 | 0.20 | 0.20 | hot-plastic worked magnet | 2000000 |
| Example 9 | $Nd_{13.3}Fe_{bal}Co_{21.5}B_6$ | 0 | 0.30 | 0.20 | hot-plastic worked magnet | 2000000 |
| Comparative Example 2 | $Nd_{13}La_{0.3}Fe_{bal}Co_{31.9}B_6$ | 0.025 | 0.40 | 0.25 | hot-plastic worked magnet | 2000000 |
| Comparative Example 3 | $Nd_{11.3}Pr_{2.6}Fe_{bal}Co_{15.9}B_{5.8}Cu_{0.15}Al_{0.2}Ga_{0.3}$ | 0 | 0.20 | 0.20 | hot-plastic worked magnet | 1000 |
| Example 10 | $Nd_{11.3}Pr_{2.6}Fe_{bal}Co_{15.9}B_{5.8}Cu_{0.15}Al_{0.2}Ga_{0.3}$ | 0 | 0.20 | 0.20 | hot-plastic worked magnet | 2000000 |
| Comparative Example 4 | $Nd_{11.3}Pr_{2.6}Fe_{bal}Co_{15.9}B_{5.8}Cu_{0.15}Al_{0.2}Ga_{0.3}$ | 0 | 0.20 | 0.20 | hot-plastic worked magnet | 10000000 |

| | Main Phase | | Grain Boundary Phase | | |
|---|---|---|---|---|---|
| | Average Particle Diameter (μm) | Volume Fraction (vol %) | Volume Fraction of 1-2 Phase (vol %) | Volume Fraction of Phases other than 1-2 Phase (vol %) | Volume Ratio of 1-2 phase in Grain Boundary Phase (vol %) |
| Comparative Example 1 | 0.300 | 95.1 | 0.0 | 4.9 | 0.00 |
| Example 1 | 0.297 | 95.1 | 0.3 | 4.6 | 0.06 |
| Example 2 | 0.453 | 95.1 | 0.6 | 4.3 | 0.13 |
| Example 3 | 0.445 | 95.1 | 1.0 | 3.9 | 0.19 |
| Example 4 | 0.350 | 95.1 | 0.0 | 4.9 | 0.01 |
| Example 5 | 0.370 | 94.9 | 0.0 | 5.1 | 0.00 |
| Example 6 | 0.430 | 96.1 | 0.1 | 3.8 | 0.02 |
| Example 7 | 0.440 | 95.5 | 0.0 | 4.5 | 0.00 |
| Example 8 | 0.420 | 95.6 | 0.6 | 3.8 | 0.14 |
| Example 9 | 0.440 | 95.6 | 1.0 | 3.4 | 0.22 |
| Comparative Example 2 | 0.520 | 95.6 | 0.4 | 4.0 | 0.09 |
| Comparative Example 3 | 6.500 | 93.3 | 5.0 | 1.7 | 0.74 |
| Example 10 | 0.360 | 93.3 | 1.3 | 5.4 | 0.19 |
| Comparative Example 4 | 0.330 | 93.3 | 3.2 | 3.5 | 0.47 |

TABLE 1-2

| | Magnetic Properties at 27° C. (300 K) | | | | Magnetic Properties at 180° C. (453 K) | | | | |
|---|---|---|---|---|---|---|---|---|---|
| | Coercivity Hc (kA/m) | Magnetic Field at 5% Demagnetization Hr (kA/m) | Hr/Hc | Residual Magnetization (T) | Coercivity Hc (kA/m) | Magnetic Field at 5% Demagnetization Hr (kA/m) | Hr/Hc | Residual Magnetization (T) | Temperature Coefficient of Residual Magnetization (%/° C.) |
| Comparative Example 1 | 1233.5 | 875.4 | 0.71 | 1.38 | 318.3 | 222.8 | 0.70 | 1.07 | −0.15 |
| Example 1 | 1209.6 | 771.9 | 0.64 | 1.39 | 421.8 | 278.5 | 0.66 | 1.18 | −0.10 |
| Example 2 | 1289.2 | 954.9 | 0.74 | 1.35 | 397.9 | 294.4 | 0.74 | 1.14 | −0.10 |
| Example 3 | 1297.1 | 931.1 | 0.72 | 1.28 | 397.9 | 286.5 | 0.72 | 1.10 | −0.09 |
| Example 4 | 1289.2 | 947.0 | 0.73 | 1.30 | 350.1 | 254.6 | 0.73 | 1.12 | −0.09 |
| Example 5 | 795.8 | 636.6 | 0.80 | 1.38 | 159.2 | 127.3 | 0.80 | 1.20 | −0.09 |

TABLE 1-2-continued

| | Magnetic Properties at 27° C. (300 K) | | | | Magnetic Properties at 180° C. (453 K) | | | | |
|---|---|---|---|---|---|---|---|---|---|
| | Coercivity Hc (kA/m) | Magnetic Field at 5% Demagnetization Hr (kA/m) | Hr/Hc | Residual Magnetization (T) | Coercivity Hc (kA/m) | Magnetic Field at 5% Demagnetization Hr (kA/m) | Hr/Hc | Residual Magnetization (T) | Temperature Coefficient of Residual Magnetization (%/° C.) |
| Example 6 | 1193.7 | 947.0 | 0.79 | 1.43 | 294.4 | 230.8 | 0.78 | 1.24 | −0.09 |
| Example 7 | 843.5 | 644.6 | 0.76 | 1.37 | 206.9 | 151.2 | 0.73 | 1.20 | −0.08 |
| Example 8 | 652.5 | 517.3 | 0.79 | 1.43 | 151.2 | 119.4 | 0.79 | 1.21 | −0.10 |
| Example 9 | 557.0 | 477.5 | 0.86 | 1.47 | 95.5 | 71.6 | 0.75 | 1.25 | −0.10 |
| Comparative Example 2 | 159.2 | 87.5 | 0.55 | 1.39 | 55.7 | 31.8 | 0.57 | 1.16 | −0.11 |
| Comparative Example 3 | 573.0 | 95.5 | 0.17 | 1.38 | 175.1 | 31.8 | 0.18 | 1.17 | −0.10 |
| Example 10 | 1281.2 | 954.9 | 0.75 | 1.34 | 374.0 | 286.5 | 0.77 | 1.13 | −0.10 |
| Comparative Example 4 | 1122.0 | 246.7 | 0.22 | 1.36 | 358.1 | 95.5 | 0.27 | 1.15 | −0.10 |

TABLE 2-1

| | | | | | | | Diffusing and Infiltrating of Modifier | | |
|---|---|---|---|---|---|---|---|---|---|
| | Composition of Rare Earth Magnet (molar ratio) | Molar Ratio x of La | Molar Ratio z of Co | z ≤ 2x + 0.2 | Production Method | Cooling Rate of Molten Alloy (° C./s) | Composition of Modifier (molar ratio) | Diffusing and Infiltrating Amount t (mol %) | Diffusion and Infiltrating Temperature (° C.) |
| Comparative Example 5 | $Nd_{13.4}Fe_{bal}B_6Cu_{0.1}Al_{0.1}Ga_{0.3}$ | 0 | 0 | 0.20 | hot-plastic worked magnet | 2000000 | $Nd_{0.6}Tb_{0.2}Cu_{0.2}$ | 1.5 | 700 |
| Example 11 | $Nd_{13.4}Fe_{bal}Co_{8.1}B_6Cu_{0.1}Al_{0.1}Ga_{0.3}$ | 0 | 0.10 | 0.20 | hot-plastic worked magnet | 2000000 | $Nd_{0.6}Tb_{0.2}Cu_{0.2}$ | 1.5 | 700 |
| Example 12 | $Nd_{13.3}Fe_{bal}Co_{16}B_6Cu_{0.1}Al_{0.1}Ga_{0.3}$ | 0 | 0.20 | 0.20 | hot-plastic worked magnet | 2000000 | $Nd_{0.6}Tb_{0.2}Cu_{0.2}$ | 1.5 | 700 |
| Comparative Example 6 | $Nd_{13.4}Fe_{bal}Co_{20}B_{5.8}Cu_{0.1}Al_{0.1}Ga_{0.3}$ | 0 | 0.25 | 0.20 | hot-plastic worked magnet | 2000000 | $Nd_{0.6}Tb_{0.2}Cu_{0.2}$ | 1.5 | 700 |
| Comparative Example 7 | $Nd_{13.4}Fe_{bal}Co_{24}B_6Cu_{0.1}Al_{0.1}Ga_{0.3}$ | 0 | 0.30 | 0.20 | hot-plastic worked magnet | 2000000 | $Nd_{0.6}Tb_{0.2}Cu_{0.2}$ | 1.5 | 700 |
| Example 13 | $Nd_{12.3}La_{0.7}Fe_{bal}Co_{20}B_{5.8}Cu_{0.1}Al_{0.1}Ga_{0.3}$ | 0.050 | 0.25 | 0.30 | hot-plastic worked magnet | 2000000 | $Nd_{0.6}Tb_{0.2}Cu_{0.2}$ | 2.5 | 700 |
| Example 14 | $Nd_{12.8}La_{0.6}Fe_{bal}Co_{24}B_6Cu_{0.1}Al_{0.1}Ga_{0.3}$ | 0.050 | 0.30 | 0.30 | hot-plastic worked magnet | 2000000 | $Nd_{0.6}Tb_{0.2}Cu_{0.2}$ | 1.5 | 700 |
| Example 15 | $Nd_{12.9}La_{0.3}Fe_{bal}Co_{15.5}B_{5.8}Cu_{0.1}Al_{0.1}Ga_{0.3}$ | 0.025 | 0.20 | 0.25 | hot-plastic worked magnet | 2000000 | $Nd_{0.6}Tb_{0.2}Cu_{0.2}$ | 1.5 | 700 |
| Example 16 | $Nd_{12.1}La_{1.3}Fe_{bal}Co_{24.5}B_{5.8}Cu_{0.1}Al_{0.1}Ga_{0.3}$ | 0.100 | 0.30 | 0.40 | hot-plastic worked magnet | 2000000 | $Nd_{0.6}Tb_{0.2}Cu_{0.2}$ | 1.5 | 700 |
| Example 17 | $Nd_{12.4}La_{0.6}Fe_{bal}Co_{12.1}B_{5.7}Cu_{0.1}Al_{0.2}Ga_{0.3}$ | 0.050 | 0.15 | 0.30 | hot-plastic worked magnet | 2000000 | $Nd_{0.6}Tb_{0.2}Cu_{0.2}$ | 1.0 | 700 |
| Comparative Example 8 | $Nd_{11.3}Pr_{2.6}Fe_{bal}Co_{15.5}B_{5.8}Cu_{0.15}Al_{0.2}Ga_{0.3}$ | 0 | 0.20 | 0.20 | sintered magnet | 1000 | $Nd_{0.6}Tb_{0.2}Cu_{0.2}$ | 1.5 | 950 |

TABLE 2-2

| | Main Phase: Average Particle Diameter (μm) | Main Phase: Volume Fraction (vol %) | Grain Boundary Phase: Volume Fraction of 1-2 Phase (vol %) | Grain Boundary Phase: Volume Fraction of Phases Other than 1-2 Phase (vol %) | Volume Fraction of 1-2 Phase in Grain Boundary Phase (vol %) | Magnetic Properties at 27° C. (300 K): Coercivity Hc (kA/m) | Magnetic Field at 5% Demagnetization Hr (kA/m) | Hr/Hc | Residual Magnetization (T) |
|---|---|---|---|---|---|---|---|---|---|
| Comparative Example 5 | 0.300 | 95.1 | 0.0 | 4.9 | 0.00 | 1687.0 | 1233.5 | 0.73 | 1.35 |
| Example 11 | 0.297 | 95.1 | 0.3 | 4.6 | 0.06 | 1671.1 | 1130.0 | 0.68 | 1.35 |
| Example 12 | 0.453 | 95.1 | 0.6 | 4.3 | 0.13 | 1448.3 | 1082.3 | 0.75 | 1.33 |
| Comparative Example 6 | 0.435 | 95.8 | 0.8 | 3.4 | 0.19 | 835.6 | 413.8 | 0.50 | 1.38 |
| Comparative Example 7 | 0.445 | 95.1 | 1.0 | 3.9 | 0.19 | 732.1 | 358.1 | 0.49 | 1.25 |
| Example 13 | 0.380 | 96.6 | 0.0 | 3.4 | 0.01 | 1512.0 | 1201.6 | 0.79 | 1.33 |
| Example 14 | 0.350 | 95.1 | 0.0 | 4.9 | 0.01 | 1297.1 | 954.9 | 0.74 | 1.29 |
| Example 15 | 0.430 | 96.1 | 0.1 | 3.8 | 0.02 | 1432.4 | 1161.8 | 0.81 | 1.39 |
| Example 16 | 0.440 | 95.5 | 0.0 | 4.5 | 0.00 | 1114.1 | 867.4 | 0.78 | 1.33 |
| Example 17 | 0.370 | 94.9 | 0.0 | 5.1 | 0.00 | 1265.3 | 899.2 | 0.71 | 1.37 |
| Comparative Example 8 | 6.500 | 93.3 | 5.0 | 1.7 | 0.74 | 1392.6 | 87.5 | 0.06 | 1.27 |
| Example 18 | 0.360 | 93.3 | 1.3 | 5.4 | 0.19 | 1352.8 | 1018.6 | 0.75 | 1.3 |
| Comparative Example 9 | 0.330 | 93.3 | 3.2 | 3.5 | 0.47 | 1106.1 | 310.4 | 0.28 | 1.32 |

| | Magnetic Properties at 180° C. (453 K): Coercivity Hc (kA/m) | Magnetic Field at 5% Demagnetization Hr (kA/m) | Hr/Hc | Residual Magnetization (T) | Temperature Coefficient of Residual Magnetization (%/° C.) | Increase Rate of Coercivity Before and After Penetration (%) |
|---|---|---|---|---|---|---|
| Comparative Example 5 | 405.8 | 294.4 | 0.73 | 1.04 | −0.15 | 36.8 |
| Example 11 | 628.7 | 413.8 | 0.66 | 1.15 | −0.10 | 38.2 |
| Example 12 | 469.5 | 342.2 | 0.73 | 1.17 | −0.08 | 12.3 |
| Comparative Example 6 | 167.1 | 87.5 | 0.52 | 1.21 | −0.08 | −9.5 |
| Comparative Example 7 | 135.3 | 55.7 | 0.41 | 1.11 | −0.07 | −43.6 |
| Example 13 | 533.2 | 413.8 | 0.78 | 1.18 | −0.07 | 46.2 |
| Example 14 | 429.7 | 310.4 | 0.72 | 1.17 | −0.06 | 1.3 |
| Example 15 | 437.7 | 334.2 | 0.76 | 1.22 | −0.08 | 20.0 |
| Example 16 | 389.9 | 310.4 | 0.80 | 1.16 | −0.08 | 32.1 |
| Example 17 | 382.0 | 270.6 | 0.71 | 1.19 | −0.09 | 59.0 |
| Comparative Example 8 | 270.6 | 23.9 | 0.09 | 1.10 | −0.09 | 143.1 |
| Example 18 | 318.3 | 246.7 | 0.78 | 1.10 | −0.10 | 5.6 |
| Comparative Example 9 | 350.1 | 87.5 | 0.25 | 1.12 | −0.10 | −1.4 |

It could be confirmed from Tables 1-1 and 1-2, Tables 2-1 and 2-2, and FIGS. 4 and 5 that in all samples of Examples, both the squareness and the residual magnetization at high temperatures are excellent. On the other hand, it could be confirmed that in samples of Comparative Examples, either one or both of the squareness and the residual magnetization at high temperatures are poor.

As can be understood from FIGS. 6 and 7, in the region where the molar ratio x of La is 0.05 or less, as long as the molar ratio x of La is equal, the molar ratio z of Co in samples having experienced diffusing and infiltrating of a modifier (see, FIG. 7) is smaller compared to samples in which a modifier is not diffused infiltrated (see, FIG. 6). This enables an understanding that a phase having an $RFe_2$-type crystal structure is likely to be generated at the time of diffusing and infiltrating of a modifier and the content ratio (molar ratio) of Co needs to be decreased.

The effects of the rare earth magnet of the present disclosure and the method for producing thereof could be confirmed from the results above.

REFERENCE SIGNS LIST

10 Main phase
20 Grain boundary phase
22 Adjacent part
24 Triple point
26 Phase having an $RFe_2$-type crystal structure
50 Liquid quenching apparatus
51 Spray nozzle
52 Heater
53 Cooling roll
54 Magnetic ribbon
55 Magnetic flake
70 Strip casting apparatus
71 Melting furnace

72 Molten alloy
73 Tundish
74 Cooling roll
75 Magnetic alloy
100 Rare earth magnet of the present disclosure
200 Conventional rare earth magnet

The invention claimed is:

1. A rare earth magnet comprising a main phase and a grain boundary phase present around the main phase, wherein the overall composition is represented, in terms of molar ratio, by the formula: $(R^1_{(1-x)}La_x)_y(Fe_{(1-z)}Co_z)_{(100-y-w-v)}B_wM^1_v$, wherein $R^1$ is Nd, $M^1$ is one or more elements selected from the group consisting of Ga, Al, Cu and In, and unavoidable impurity elements, $0.01 \leq x \leq 0.1$,
$12.0 \leq y \leq 20.0$,
$0.15 \leq z \leq 0.3$,
$5.0 \leq w \leq 20.0$, and
$0.05 \leq v \leq 2.0$, the main phase has an $R_2Fe_{14}B$ crystal structure, wherein R is a rare earth element, the average particle diameter of the main phase is less than 1 μm, the volume ratio of a phase having an $RFe_2$ crystal structure in the grain boundary phase is 0.40 or less relative to the grain boundary phase, and an Nd/Cu alloy is diffused and infiltrated in the grain boundary phase.

2. A method for producing the rare earth magnet according to claim 1, comprising:

preparing a molten alloy having a composition represented, in terms of molar ratio, by the formula: $(R^1_{(1-x)}La_x)_y(Fe_{(1-z)}Co_z)_{(100-y-w-v)}B_wM^1_v$, wherein $R^1$ is one or more elements selected from the group consisting of Nd, $M^1$ is one or more elements selected from the group consisting of Ga, Al, Cu and In, and unavoidable impurity elements, $0.01 \leq x \leq 0.1$,
$12.0 \leq y \leq 20.0$,
$0.1 \leq z \leq 0.3$,
$5.0 \leq w \leq 20.0$, and
$0.5 \leq v \leq 2.0$, cooling the molten alloy at a rate of $5\times10^5$ to $5\times10^7$° C./sec to obtain a magnetic ribbon or a magnetic flake, and pressure-sintering the magnetic ribbon or magnetic flake to obtain a sintered body.

3. The method for producing a rare earth magnet according to claim 2, wherein the magnetic ribbon or magnetic flake is pressure-sintered at 550 to 750° C.

4. The method for producing a rare earth magnet according to claim 2, further comprising subjecting the sintered body to hot plastic working.

5. The method for producing a rare earth magnet according to claim 2, wherein:

x and z satisfy $z \leq 2x+0.2$, and the method for producing further comprises:

preparing a modifier having a composition represented, in terms of molar ratio, by the formula: $R^2_{(1-s)}M^2_s$, wherein $R^2$ is one or more elements selected from the group consisting of Nd, Pr, Gd, Tb, Dy and Ho, $M^2$ is composed of a metal element which is other than a rare earth element and can be alloyed with $R^2$, and an unavoidable impurity elements, and $0.05 \leq s \leq 0.40$, and causing the modifier diffused and infiltrated into the sintered body.

6. The method for producing a rare earth magnet according to claim 5, wherein the diffusive penetration is performed at 550 to 750° C.

7. The method for producing a rare earth magnet according to claim 5, wherein $R^2$ is Nd and Tb and $M^2$ is Cu and unavoidable impurity elements.

8. The method for producing a rare earth magnet according to claim 2, wherein $M^1$ is one or more elements selected from the group consisting of Ga, Al and Cu, and unavoidable impurity elements.

9. A rare earth magnet comprising a main phase and a grain boundary phase present around the main phase, wherein the overall composition is represented, in terms of molar ratio, by the formula: $(R^1_{(1-x)}La_x)_y(Fe_{(1-z)}Co_z)_{(100-y-w-v)}B_wM^1_v\cdot(R^2_{(1-s)}M^2_s)_t$, wherein each of $R^1$ and $R^2$ is one or more elements selected from the group consisting of Nd, Pr, Gd, Tb, Dy and Ho, $M^1$ includes In and optionally one or more elements selected from the group consisting of Ga, Al, Cu, Au, Ag, Zn, and Mn, and an unavoidable impurity element, $M^2$ is composed of a metal element which is other than a rare earth element and can be alloyed with $R^2$, and unavoidable impurity elements, $0 \leq x \leq 0.1$,
$12.0 \leq y \leq 20.0$,
$0.1 \leq z \leq 0.3$,
$5.0 \leq w \leq 20.0$, and
$0 \leq v \leq 2.0$,
$0.05 \leq s \leq 0.40$, and
$0.1 \leq t \leq 10.0$, x and z satisfy $z \leq 2x+0.2$, the main phase has an $R_2Fe_{14}B$-type crystal structure, wherein R is a rare earth element, the average particle diameter of the main phase is less than 1 μm, and the volume ratio of a phase having an $RFe_2$-type crystal structure in the grain boundary phase is 0.40 or less relative to the grain boundary phase.

* * * * *